US012811304B2

(12) United States Patent
Matsunaga et al.

(10) Patent No.: US 12,811,304 B2
(45) Date of Patent: Nov. 24, 2026

(54) REFLECTING DEVICE

(71) Applicant: Japan Display Inc., Tokyo (JP)

(72) Inventors: Kazuki Matsunaga, Tokyo (JP); Mitsutaka Okita, Tokyo (JP); Shinichiro Oka, Tokyo (JP); Daiichi Suzuki, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 19/246,909

(22) Filed: Jun. 24, 2025

(65) Prior Publication Data

US 2025/0372884 A1 Dec. 4, 2025

Related U.S. Application Data

(63) Continuation of application No. PCT/JP2023/043409, filed on Dec. 5, 2023.

(30) Foreign Application Priority Data

Jan. 25, 2023 (JP) ................................ 2023-009514

(51) Int. Cl.
*H01Q 15/14* (2006.01)
*H01Q 17/00* (2006.01)

(52) U.S. Cl.
CPC ........... *H01Q 15/14* (2013.01); *H01Q 17/007* (2013.01)

(58) Field of Classification Search
CPC ...... H01Q 1/38; H01Q 3/44-46; H01Q 15/00; H01Q 15/14; H01Q 9/0414; H01Q 17/007; H01Q 19/10
See application file for complete search history.

(56) References Cited

U.S. PATENT DOCUMENTS

| | | | | |
|---|---|---|---|---|
| 9,748,663 B2 * | 8/2017 | Wong | .................... | H01P 1/2005 |
| 10,490,903 B2 * | 11/2019 | Foo | ...................... | H01Q 21/065 |
| 2018/0083364 A1 | 3/2018 | Foo | | |
| 2024/0243473 A1 * | 7/2024 | Lee | .......................... | H01Q 3/46 |

FOREIGN PATENT DOCUMENTS

| | | |
|---|---|---|
| JP | H11-103201 A | 4/1999 |
| JP | 2019-530387 A | 10/2019 |

OTHER PUBLICATIONS

International Search Report and Written Opinion mailed on Feb. 27, 2024, received for PCT Application No. PCT/JP2023/043409, filed on Dec. 5, 2023, 10 pages including English Translation.

* cited by examiner

*Primary Examiner* — Hasan Islam
(74) *Attorney, Agent, or Firm* — XSENSUS LLP

(57) ABSTRACT

A reflecting device includes an array substrate, a plurality of reflecting elements, a wiring, and a metasurface. The array substrate has a radio-wave reflection area and a frame area surrounding the radio-wave reflection area. The plurality of reflecting elements is located over the radio-wave reflection area. The wiring is electrically connected to at least one of the plurality of reflecting elements and at least partially overlaps the frame area. The metasurface overlaps the wiring in the frame area. The metasurface includes a first conductive film, a plurality of absorption-control units each overlapping the first conductive film and having at least one conductive film, and an insulating layer between the first conductive film and the plurality of absorption-control units.

16 Claims, 24 Drawing Sheets

100

100

100

100

100

100

Model
metasurface 5

Model
metasurface 6

REFLECTING DEVICE

CROSS-REFERENCE TO RELATED APPLICATIONS

This application is a Continuation of International Patent Application No. PCT/JP2023/043409, filed on Dec. 5, 2023, which claims the benefit of priority to Japanese Patent Application No. 2023-009514, filed on Jan. 25, 2023, the entire contents of each are incorporated herein by reference.

FIELD

An embodiment of the present invention relates to a reflecting device.

BACKGROUND

Since liquid crystal molecules have an anisotropic dielectric constant, the dielectric constant of the liquid crystal layer can be controlled by adjusting the electric field applied to the liquid crystal layer containing liquid crystal molecules to control the orientation of the liquid crystal molecules. It has been known that such characteristics can be used to provide a reflecting device with controllable reflective characteristics (see, for example, Japanese Laid-Open Patent Applications No. H11-103201 and 2019-530387).

SUMMARY

An embodiment of the invention is a reflecting device. The reflecting device includes an array substrate, a plurality of reflecting elements, a wiring, and a metasurface. The array substrate has a radio-wave reflection area and a frame area surrounding the radio-wave reflection area. The plurality of reflecting elements is located over the radio-wave reflection area. The wiring is electrically connected to at least one of the plurality of reflecting elements and at least a portion thereof overlaps the frame area. The metasurface overlaps the wiring in the frame area. The metasurface includes a first conductive film, a plurality of absorption-control units each overlapping the first conductive film and having at least one conductive film, and an insulating layer between the first conductive film and the plurality of absorption-control units.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, the drawings are only an example, and do not limit the interpretation of the invention. In the specification and the drawings, the same reference number is provided to an element that is the same as that which appears in preceding drawings, and a detailed explanation may be omitted as appropriate.

In the specification and the claims, unless specifically stated, when a state is expressed where a structure is arranged “over” another structure, such an expression includes both a case where the substrate is arranged immediately above the “other structure” so as to be in contact with the “other structure” and a case where the structure is arranged over the “other structure” with an additional structure therebetween.

In the specification and the claims, an expression “a structure is exposed from another structure” means a mode in which a portion of the structure is not covered by the other structure and includes a mode where the portion uncovered by the other structure is further covered by another structure. In addition, the mode expressed by this expression includes a mode where the structure is not in contact with the other structure.

In the present invention, when one film is processed to form a plurality of films, these films may have different functions and roles. However, these films originate from the film prepared as the same layer by the same process and have substantially the same layer structure, material, and morphology. Hence, the plurality of films is defined as existing in the same layer.

1. Structure of Reflecting Device

Hereinafter, the structure of a reflecting device according to an embodiment of the present invention is explained. The reflecting device is a so-called liquid-crystal reflecting device and is a device which utilizes the change in a dielectric constant caused by the orientation change of the liquid crystal layer due to an electric field to reflect applied radio waves in arbitrary directions. There are no restrictions on the frequency of the radio waves to be reflected, and the frequence of the radio waves is in the range of 400 MHz to 50 GHz, for example. Typically, the reflecting device 100 can be used to reflect radio waves in the 400 MHz to 6.0 GHz band, the 2.5 GHz to 4.7 GHz band, and the 24 GHz to 50 GHz band.

Figure 1:
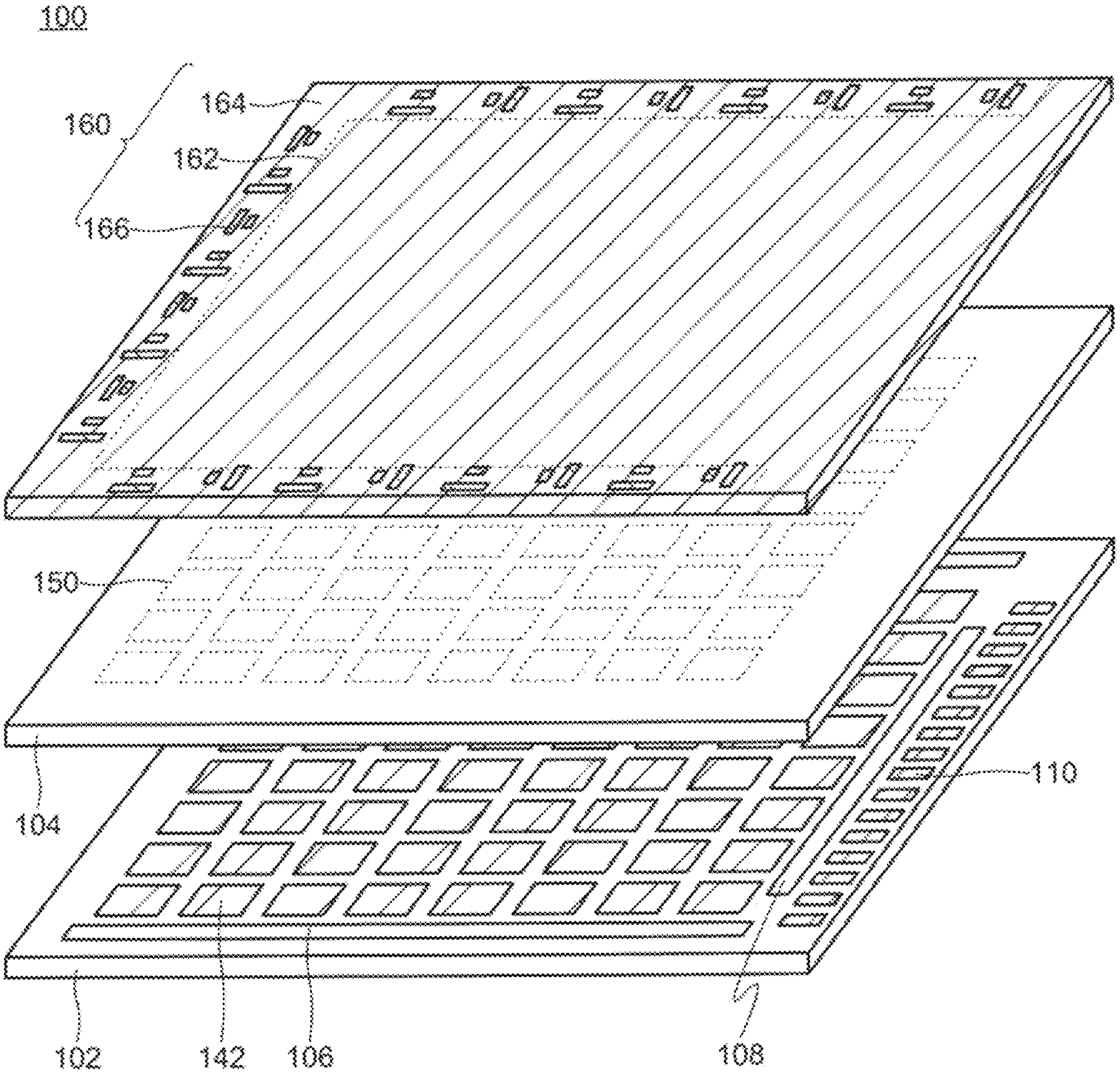
FIG. 1 is a schematic developed perspective view of a reflecting device according to an embodiment of the invention.

FIG. 1 shows a schematic developed perspective view of the reflecting device 100. The reflecting device 100 has a substrate (hereinafter, referred to as an array substrate) 102 and a counter substrate 104, and a plurality of reflecting elements arranged in a matrix shape with a plurality of rows and columns is provided between the array substrate 102 and the counter substrate 104. The area in which the reflecting elements are arranged (a single rectangular area simultaneously surrounding all of the reflecting elements) is called a radio-wave reflection area. In the radio-wave reflection area, incident radio waves can be reflected in arbitral directions using the reflecting elements. The area surrounding the radio-wave reflection area is called a frame area or peripheral area.

Driver circuits (scanning-line driver circuit 106, signal-line driver circuit 108) for driving the reflecting elements may be provided in the frame area of the array substrate 102. A plurality of wirings which is not illustrated in FIG. 1 is further provided over the array substrate 102. The wirings electrically connect the driver circuits and the reflecting elements, and at least part of the wirings extends over the frame area and reaches an edge of the array substrate 102. The wirings are exposed at the edge of the array substrate 102 to form a plurality of terminals 110. A flexible printed circuit (FPC) board (not illustrated) is connected to the terminals 110. A variety of driving signals for driving the reflecting device 100 is supplied from an external circuit via the flexible printed circuit and the terminals 110, and the driver circuits generate control signals for controlling the reflecting elements on the basis of the driving signals and supply them to the reflecting elements. Note that the scanning-line driver circuit 106 and/or the signal-line driver circuit 108 may not be provided, and control signals may be supplied directly from an external circuit to the reflecting elements via the wirings.

The reflecting device 100 further includes a metasurface 160 over the counter substrate 104. As described in detail below, the metasurface 160 is provided to absorb part of the radio waves incident on the reflecting device 100 and to suppress reflections in the frame area. These components are described in detail below.

(1) Array Substrate and Counter Substrate

Figure 2:
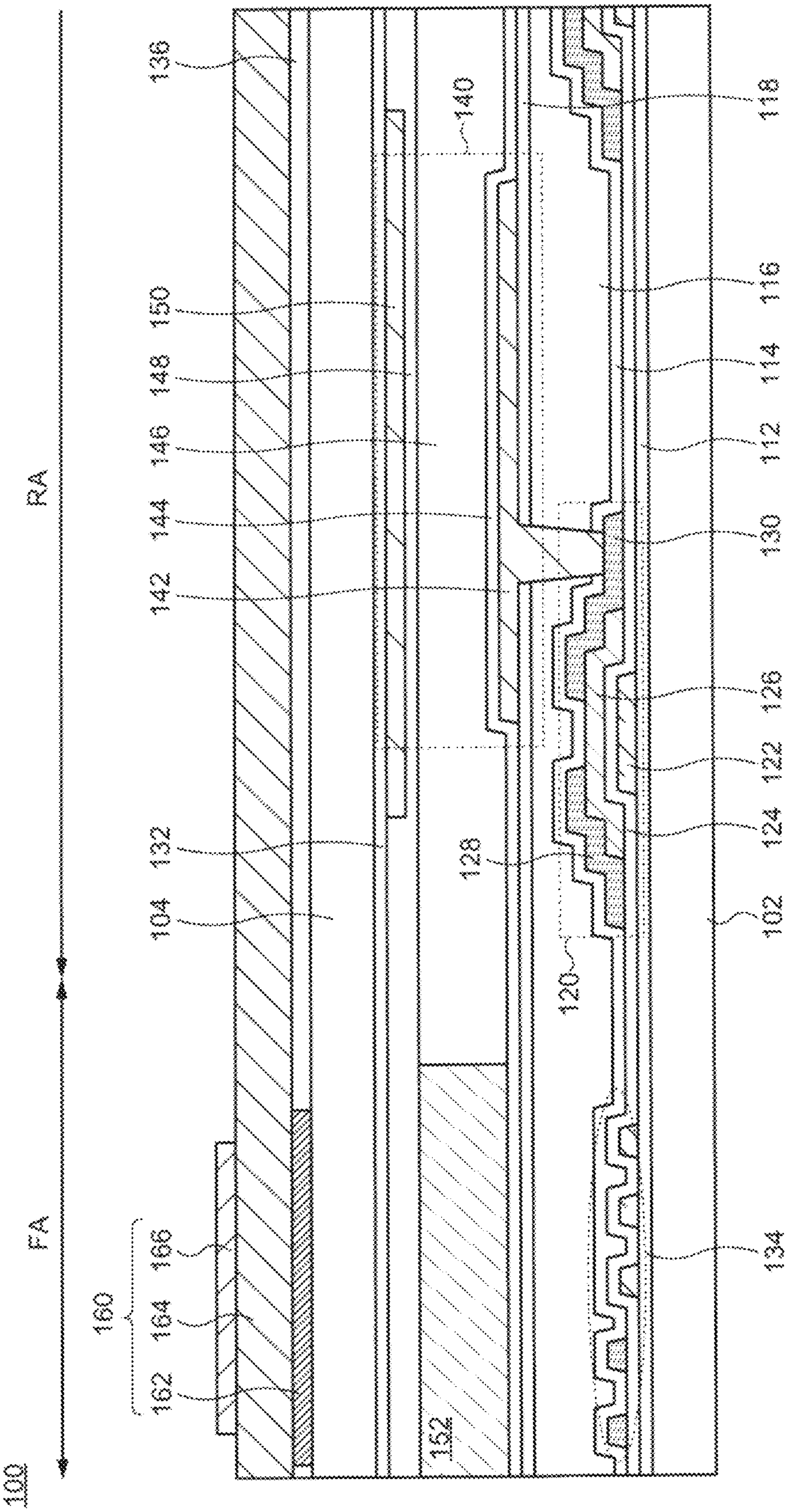
FIG. 2 is a schematic cross-sectional view of a reflecting device according to an embodiment of the invention.

FIG. 2 shows a schematic cross-sectional view of the reflecting device 100. This figure shows a schematic cross-sectional view of a portion of the plurality of reflecting elements 140 provided in the radio-wave reflection area RA as well as the frame area FA. The array substrate 102 and the counter substrate 104 face each other and provide physical strength to the reflecting device 100 as well as a surface for arranging the reflecting elements. The array substrate 102 and the counter substrate 104 may include an inorganic insulator such as glass and quartz, a semiconductor such as silicon, a polymer such as a polyimide, a polycarbonate and a polyester, and a metal such as aluminum, copper, and stainless steel. When a conductive material such as a metal is included, it is preferable to provide an undercoat 112 and an overcoat 132 over the surface over which the reflecting elements 140 are provided, that is, the surface of the array substrate 102 on the counter substrate 104 side and the surface of the counter substrate 104 on the array substrate 102 side. The array substrate 102 and the counter substrate 104 may or may not transmit visible light. The array substrate 102 and/or the counter substrate 104 may be flexible. The array substrate 102 and the counter substrate 104 are fixed to each other by a sealing material 152 directly or through a first orientation film 144 and a second orientation film 148 described below.

(2) Reflecting Element

As shown in FIG. 2, the reflecting element 140 includes a driving electrode 142, the first orientation film 144 over the driving electrode 142, a liquid crystal layer 146 over the first orientation film 144, the second orientation film 148 over the liquid crystal layer 146, and a common electrode 150 over the second orientation film 148. Radio waves are incident from the common electrode 150 side. Thus, the common electrode 150 functions as a patch electrode in the reflecting element 140.

Each reflecting element 140 is connected to an element circuit including at least one transistor 120. Each element circuit may include a plurality of transistors and may further include one or more capacitive elements. As can be understood from FIG. 2, the element circuit including the transistor 120 and the reflecting element 140 are provided over the array substrate 102 directly or through the undercoat 112 which is an optional component. The transistor included in the element circuits is not restricted in its structure and may be a bottom-gate or top-gate transistor. Alternatively, the transistor may be a transistor respectively having gate electrodes over and under a semiconductor film. The transistor illustrated in FIG. 2 is a bottom-gate transistor and is composed of a gate electrode 122, a gate insulating film 124 over the gate electrode 122, a semiconductor film 126 over the gate insulating film 124, and a pair of terminals 128 and 130 over the semiconductor film 126. A leveling film 116 is provided over the transistor 120, over which the reflecting element 140 is formed. Interlayer insulating films 114 and 118 may be respectively provided between the transistor 120 and the leveling film 116 and over the leveling film 116 as optional components.

The driving electrode 142 of the reflecting element 140 is electrically connected to the transistor 120 through an opening formed in the interlayer insulating film 118 and the leveling film 116. A variety of signals supplied from an external circuit is supplied to the reflecting elements 140 via the wirings 134 forming the terminal 110 either directly or via the driver circuit. As shown in FIG. 2, at least a portion of the wirings 134 extends over the frame area FA. The wirings 134 may exist in the same layer as the gate electrode 122 or the terminals 128 and 130. Alternatively, a portion of the wirings 134 may exist in the same layer as the gate electrode 122 and another portion thereof may exist in the same layer as the terminals 128 and 130.

The gate electrode 122, the gate insulating film 124, the semiconductor film 126, and the terminals 128 and 130, which constitute the transistor 120, the interlayer insulating films 114 and 118 and the leveling film 116, which cover the transistor 120, as well as the wirings 134 can be formed by using known materials and applying known methods as appropriate. Thus, a detailed description is omitted. In brief, the gate electrode 122, the terminals 128 and 130, and the wiring 134 are formed by forming a film containing a metal such as tantalum, molybdenum, titanium, and aluminum using a sputtering method, a chemical vapor deposition (CVD) method, or the like, followed by patterning this film as appropriate using photolithography processes. The semiconductor film 126 is formed as a film containing a Group 14 element exemplified by silicon or a film containing an oxide of a Group 13 element such as indium and gallium. The semiconductor film 126 may be formed by applying a sputtering method or a CVD method. The gate insulating film 124, the interlayer insulating films 114 and 118, the undercoat 112, and the overcoat 132 include an inorganic compound such as silicon oxide and silicon nitride and are formed by applying a sputtering method or a CVD method. The leveling film 116 includes a polymer such as an acrylic resin, an epoxy resin, a polyimide, a polyamide, and a silicon resin, and can be formed by applying a wet film-forming method such as a spin coating method, an inkjet method, and a printing method as appropriate. The formation of the leveling film 116 allows the reflecting elements 140 to be formed over a flat surface.

The driving electrode 142 of the reflecting element 140 includes, for example, a metal such as copper, aluminum, tungsten, molybdenum, and titanium or an alloy including at least one of these metals. Alternatively, the driving electrode 142 may include a conductive oxide having a light-transmitting property such as indium-zinc oxide (IZO) and indium-tin oxide (ITO). The driving electrode 142 may have a monolayer structure or a stacked-layer structure with layers of different compositions. For example, a stacked structure of a layer containing a conductive oxide and a layer containing the above-mentioned metals or alloys may be employed. Alternatively, the driving electrode 142 may have a mesh shape in order to provide a light-transmitting property to the driving electrode 142 containing a metal or an alloy.

The first orientation film 144 disposed over the plurality of driving electrodes 142 is provided in order to control the orientation of the liquid crystal molecules constituting the liquid crystal layer 146 and provided thereover. The first orientation film 144 may be provided continuously over the plurality of reflecting elements 140. In other words, the first orientation film 144 may be provided so as not to be divided between adjacent reflecting elements 140 and to be shared by all of the reflecting elements 140.

The first orientation film 144 includes a polymer such as a polyimide and a polyester. The first orientation film 144 is formed by utilizing a wet film-forming method such as an ink-jet method, a spin-coating method, a printing method, and a dip-coating method, and its surface is subjected to a rubbing treatment. Alternatively, the first orientation film 144 may be formed by a photo-alignment treatment.

The liquid crystal layer 146 is sealed between the array substrate 102 and the counter substrate 104 with the sealing material 152. The structure of the liquid crystal molecules in the liquid crystal layer 146 is not limited. Thus, the liquid crystal molecules may be nematic liquid crystals, smectic liquid crystals, cholesteric liquid crystals, or chiral smectic liquid crystals. The thickness of the liquid crystal layer 146 is, for example, equal to or more than 20 μm and equal to or less than 50 μm, or equal to or more than 30 μm and equal to or less than 50 μm. Although not illustrated, spacers may be provided in the liquid crystal layer 146 to maintain this thickness throughout the reflecting device 100. Note that, if the aforementioned thickness of the liquid crystal layer 146 is employed in the liquid crystal display device, the high responsiveness required to display moving images cannot be obtained and it becomes significantly difficult to realize the functions as a liquid crystal display device.

The second orientation film 148 is also provided to control the orientation of the liquid crystal molecules and has the same structure as the first orientation film 144. The second orientation film 148 may also be continuous over adjacent reflecting elements 140 and may be formed to be shared by the plurality of reflecting elements 140. The first orientation film 144 and the second orientation film 148 are arranged so that the direction in which the first orientation film 144 orients the liquid crystal molecules is parallel to that of the second orientation film 148. The first orientation film 144 and the second orientation film 148 cause the liquid crystal molecules to be oriented in a certain direction.

The common electrode 150 is provided for each reflecting element 140. Therefore, the common electrodes 150 are also arranged in a matrix shape having a plurality of rows and columns and overlap the driving electrodes 142 in each reflecting element 140. As described above, radio waves are incident from the common electrode 150 side. Therefore, the common electrode 150 is preferred to have a highly symmetrical shape such as a regular polygon or a circle to efficiently reflect both orthogonal components (vertically polarized wave and horizontally polarized wave) of the radio waves. The size of the common electrode 150 may be adjusted according to the wavelength of the radio wave to be reflected. For example, the lengths in the row direction and the column direction may be selected from a range equal to or more than 1 mm and equal to or less than 40 mm. Although not illustrated, the plurality of common electrodes 150 is electrically connected to each other in the row direction and/or the column direction with a connecting wiring. The common electrodes 150 are supplied with a constant potential (common potential) from an external circuit directly or via the signal-line driver circuit 108.

Similar to the driving electrode 142, the common electrode 150 may also include, for example, a metal such as copper, aluminum, tungsten, molybdenum, and titanium, an alloy containing at least one of these metals, or a conductive oxide such as ITO and IZO. The common electrode 150 may also have a single-layer structure or a stacked-layer structure in which layers of different compositions are stacked. The common electrode 150 may also be formed by applying a sputtering method or a CVD method. Note that the reflecting element 140 may or may not transmit visible light. For example, visible light may be blocked using a metal or an alloy having a thickness which does not allow visible light to transmit the driving electrode 142 and the common electrode 150.

As described above, the directions in which the first orientation film 144 and the second orientation film 148 orient the liquid crystal molecules are parallel in the reflecting device 100. Therefore, when no potential difference is applied between the driving electrode 142 and the common electrode 150, the liquid crystal molecules are splay-oriented because no vertical electric field is generated in the liquid crystal layer 146. Since the orientation of the liquid crystal layer 146 is the same between the reflecting elements 140, the dielectric constant is also constant within the liquid crystal layer 146. Hence, the spread (phase) of the reflected waves generated when radio waves incident from the common electrode 150 side are reflected on the surface of the common electrode 150 does not change. As a result, the incident radio waves are directly reflected by the reflecting device 100, generating a reflected wave having the same exit angle as the incident angle.

In contrast, when the voltage applied to the driving electrode 142 is controlled using the element circuit to provide a potential difference between the driving electrode 142 and the common electrode 150, the generated vertical electric field causes the liquid crystal molecules to rise and bend-orientate. When vertical electric fields of different intensity are generated between the radio reflective elements 140, the dielectric constant of the liquid crystal layer 146 changes between the radio reflective elements 140 according to the intensity of the vertical electric fields. As a result, the phase of the reflected waves changes, which in turn changes the reflection direction of the radio waves incident on the radio-wave reflection area RA. The reflection direction can be arbitrarily controlled by changing the intensity of the vertical electric fields formed in the reflecting elements 140.

(3) Metasurface

As shown in FIG. 1 and FIG. 2, the metasurface 160 has a first conductive film 162, a plurality of absorption-control units 166, and an insulating layer 164 located between the first conductive film 162 and the plurality of absorption-control units 166 as its fundamental components. The metasurface 160 may be fixed to the counter substrate 104 using an adhesive layer 136 or may be formed by sequentially stacking the first conductive film 162, the insulating layer 164, and the absorption-control units 166 over the counter substrate 104.

Figure 3A:
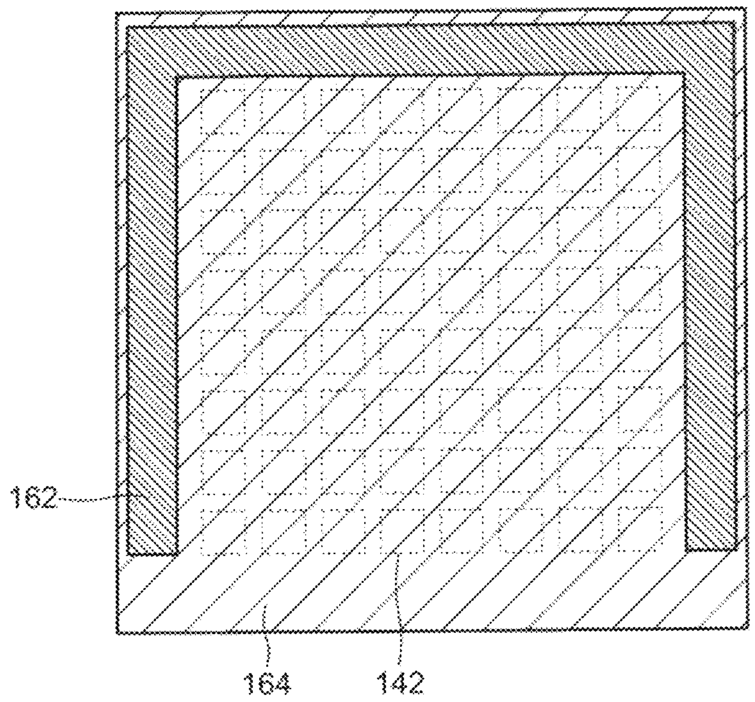
FIG. 3A is a schematic bottom view of a reflecting device according to an embodiment of the invention.
Figure 3B:
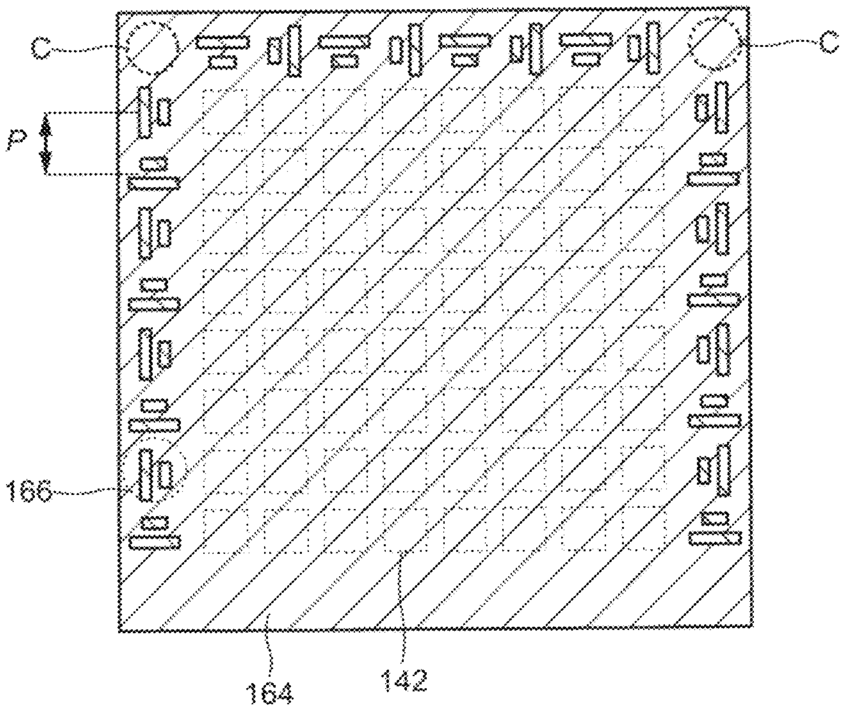
FIG. 3B is a schematic top view of a reflecting device according to an embodiment of the invention.

FIG. 3A and FIG. 3B respectively show schematic bottom and top views of the metasurface 160. FIG. 3A is a schematic view of the metasurface 160 from the first conductive film 162 side, while FIG. 3B is a schematic view of the metasurface 160 from the absorption-control unit 166 side. As can be understood from FIG. 1, FIG. 2, and FIG. 3A, the first conductive film 162 is arranged so as to overlap the frame area FA of the array substrate 102 and overlap at least a portion of the wirings 134 over the frame area FA. Although the first conductive film 162 is not provided in the frame area FA on the terminal 110 side and has a U-shape in the example shown in FIG. 1 and FIG. 3A, the first conductive film 162 may be provided in the frame area FA on the terminal 110 side so as to surround four sides of the radio-wave reflection area RA.

The first conductive film 162 may include a conductive oxide such as ITO and IZO or may include a metal such as copper, aluminum, tungsten, molybdenum, and titanium or an alloy containing at least one of these metals. Preferably, the first conductive film 162 is configured to include a highly conductive metal such as titanium, molybdenum, and tungsten so that the metasurface 160 exhibits high radio-wave absorption properties. The first conductive film 162 may be electrically floated or may be applied with a constant potential (common potential). In the latter case, the potential applied to the first conducting film 162 may be the same as the potential applied to the common electrode 150.

The insulating layer 164 includes, for example, glass, quartz, or a polymeric material such as an epoxy resin and an acrylic resin, a polyimide resin, a polyamide resin, and a silicon resin. The insulating layer 164 is provided so as to overlap the entire first conductive film 162. The thickness of the insulating layer 164 is, for example, equal to or more than 0.1 mm and equal to or less than 1 mm. The insulating layer 164 functions as a dielectric in the metasurface 160.

The plurality of absorption-control units 166 is each provided to overlap the first conductive film 162 via the insulating layer 164 (see FIG. 2 and FIG. 3B). The plurality of absorption-control units 166 is arranged to surround the radio-wave reflection area RA. Thus, at least a pair of absorption-control units 166 surrounding the radio-wave reflection area RA can be selected from the plurality of absorption-control units 166. Similar to the first conductive film 162, the plurality of absorption-control units 166 may be arranged to surround the four sides of the radio-wave reflection area RA.

Figure 4A:
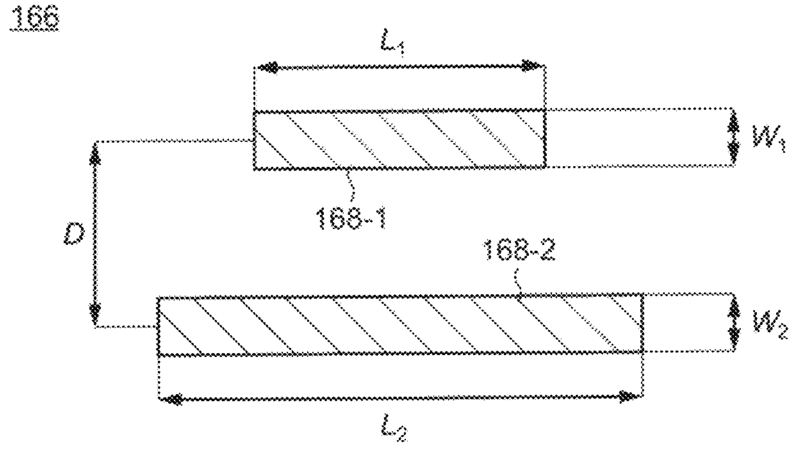
FIG. 4A is a schematic top view of a reflecting device according to an embodiment of the invention.
Figure 4B:
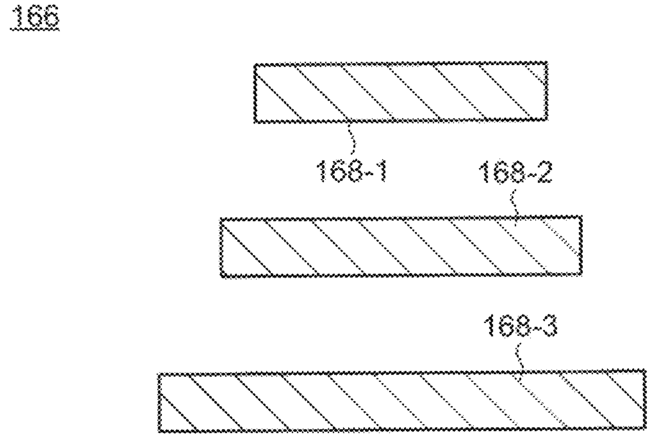
FIG. 4B is a schematic top view of a reflecting device according to an embodiment of the invention.

Each of the plurality of absorption-control units 166 has at least one electrically floating conductive film. Each absorption-control unit 166 may consist of a single conductive film or may include n (n is an integer equal to or greater than 2) conductive films. For example, each absorption-control unit 166 may include two rectangular conductive films 168-1 and 168-2 as shown in FIG. 4A or may include three rectangular conductive films 168-1, 168-2, and 168-3 as shown in FIG. 4B.

Here, the plurality of rectangular conductive films 168 is arranged parallel to each other in each absorption-control unit 166. That is, the rectangular conductive films 168 are arranged so that their longitudinal directions are parallel. At the same time, the plurality of rectangular conductive films 168 are arranged so as to overlap each other in a direction perpendicular to the longitudinal direction (short-side direction) in each absorption-control unit 166. In addition, the plurality of rectangular conductive films 168 are preferably arranged so that the centers (or centers of gravity) of all of the rectangular conductive films 168 are located on the same straight line perpendicular to the longitudinal direction in each absorption-control unit 166.

Furthermore, the plurality of rectangular conductive films 168 are configured to have different lengths (lengths in the longitudinal direction) from one another in each absorption-control unit 166. In other words, there are no more than two rectangular conductive films 168 of the same length in each absorption-control unit 166. The length L of the rectangular conductive film 168 depends on the wavelength of the radio waves to be reflected, but is, for example, equal to or greater than 0.5 mm and equal to or less than 2 mm. The length $L_1$ of the shortest rectangular conductive film 168 of each absorption-control unit 166 may be selected from, for example, a range equal to or greater than 0.5 mm and equal to or less than 1.6 mm. On the other hand, the length $L_2$ of the longest rectangular conductive film 168 of each absorption-control unit 166 may be selected from a range, for example, equal to or greater than 0.5 mm and equal to or less than 2.0 mm (see FIG. 4A.) The difference between the lengths $L_1$ and $L_2$ also depends on the wavelength of the radio waves to be reflected but may be equal to or greater than 0.1 mm and equal to or less 0.3 mm, for example.

The width (length in the short-side direction) W of each absorption-control unit 166 also depends on the wavelength of the radio waves to be reflected but may be selected from a range equal to or greater than 0.05 mm and equal to or less than 2.0 mm, for example. In each absorption-control unit 166, the width W of the plurality of rectangular conductive films 168 may be the same as or different from one another. For example, when each absorption-control unit 166 has two rectangular conductive films 168, their widths $W_1$ and $W_2$ may be the same as or different from each other (see FIG. 4A).

In each absorption-control unit 166, the distance D between adjacent rectangular conductive films 168 is also adjusted according to the wavelength of the radio waves to be reflected. For example, the distance D may be selected from a range equal to or greater than 0.2 mm and equal to or less than 1.0 mm. Note that the distance D is a distance between the centers (or centers of gravity) of adjacent rectangular conductive films 168 in the short-side direction of the rectangular conductive film 168.

The aforementioned shapes and arrangements allow the metasurface 160 to selectively absorb radio waves with desired wavelengths as demonstrated in the simulation results described in the Example. As a result, radio-wave reflection in the frame area FA can be suppressed, and radio waves can be selectively reflected in the radio-wave reflection area RA. As described below, such characteristics contribute to precise control of the reflection direction.

The plurality of absorption-control units 166 is preferably arranged so that the longitudinal directions of the rectangular conductive films 168 are perpendicular between adjacent absorption-control units 166. For example, it is preferable to arrange the plurality of absorption-control units 166 so that the longitudinal directions of the rectangular conductive films 168 alternate (see FIG. 3B). This arrangement enables effective absorption of both vertically polarized waves and horizontally polarized waves. Note that, when absorbing only one of the vertically polarized radio waves and horizontally polarized radio waves, the longitudinal directions of the rectangular conductive films 168 may be parallel to each other in all of the absorption-control units 166.

Figure 5:
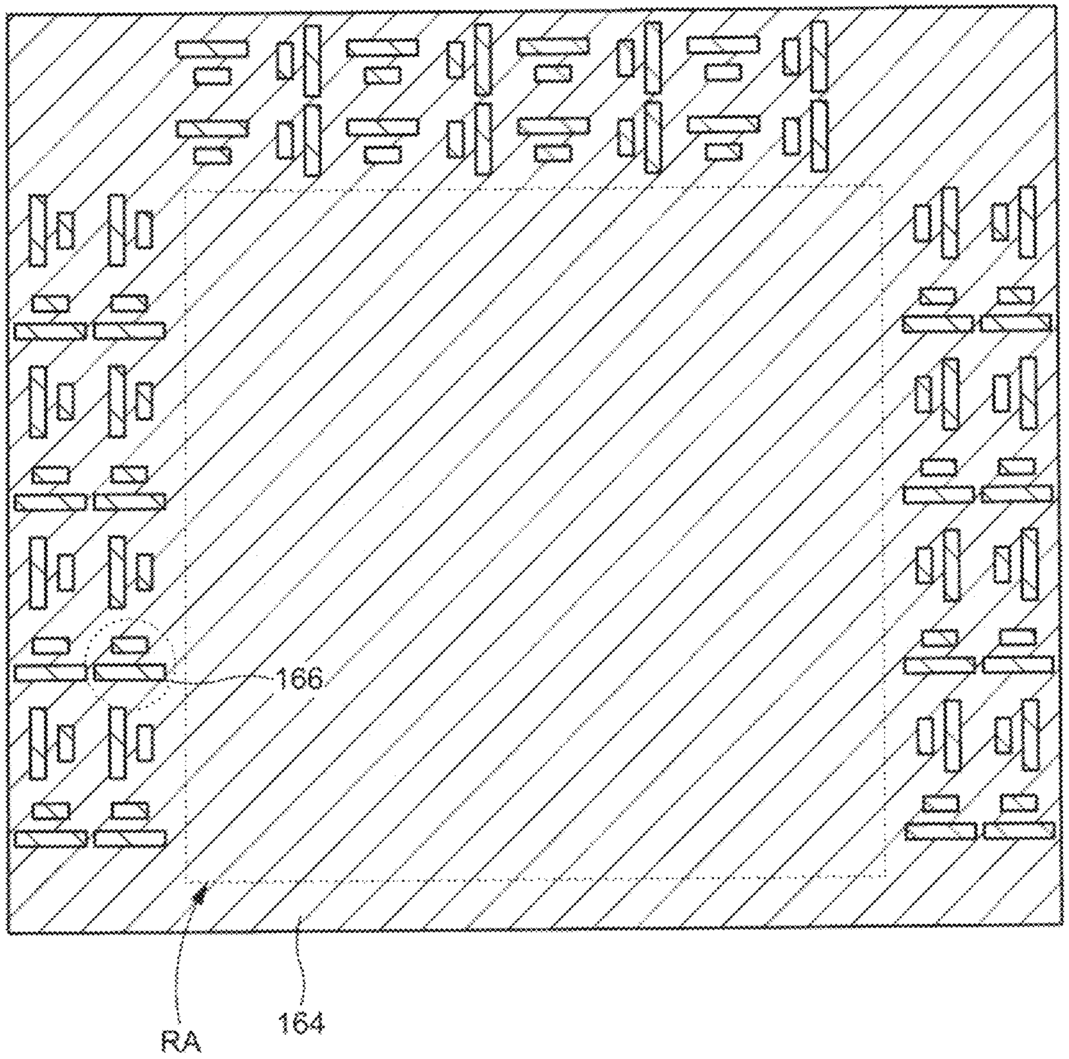
FIG. 5 is a schematic top view of a reflecting device according to an embodiment of the invention.

The pitch P of the absorption-control units 166 (see FIG. 3B) also depends on the wavelength of the radio waves to be reflected but may be selected from a range equal to or greater than 0.4 mm and equal to or less than 3.0 mm, for example. Preferably, the pitch P is twice the distance D. Furthermore, the pitch P may be the same as or substantially the same as the pitch of the driving electrodes 142 or the common electrodes 150. Hence, a pair of absorption-control units 166 can be arranged to sandwich the plurality of reflecting elements 140 in each row as shown in FIG. 3B. The same number of absorption-control units 166 as the number of columns can be arranged in the row direction at the positions corresponding to each column. In the example shown in FIG. 3B, if the number of rows and the number of columns of the matrix shape formed by the plurality of driving electrodes 142 is respectively N and M, the number of absorption-control units 166 is (2N+M). However, the arrangement of the absorption-control units 166 is not limited to that described above. For example, the absorption-control units 166 may be arranged in multiple rows or multiple columns along each side of the radio-wave reflection area FA as shown in FIG. 5. Although not illustrated in FIG. 3B, the absorption-control units 166 may also be arranged at the location represented by C, which is a corner, i.e., where the arrangement direction of the absorption-control units 166 arranged in the row direction intersects that of the absorption-control units 166 arranged in the column direction. In this case, the absorption-control units 166 may be arranged so that the repetition pattern of the absorption-control units 166 arranged in the row direction and the repetition pattern of the absorption-control units 166 arranged in the column direction are consistent with each other.

As mentioned above, the wirings 134 for supplying a variety of signals are disposed in the frame area FA of the reflecting device 100. In addition, the driver circuits may also be placed in the frame area FA. Since the structures such as the wirings 134 and the driver circuits also reflect radio waves, the radio waves reflected by the reflecting device 100 include not only the desired reflected waves obtained in the radio-wave reflection area RA but also those reflected in the frame area FA. This causes a reduction in the amplitude of the reflected waves, which in turn reduces the reflection characteristics.

However, the arrangement of the aforementioned metasurfaces 160 enables effective absorption of the radio waves incident on the frame area FA. As a result, the radio waves incident on the reflecting device 100 can be selectively reflected in the radio-wave reflection area RA, resulting in excellent reflection characteristics with suppressed amplitude reduction of the reflected waves.

2. Modified Example

The configuration of the reflecting device 100 according to an embodiment of the present invention is not limited to the configuration described above, and a variety of modification is possible. Hereinafter, modified examples of the reflecting device 100 are described.

(1) Absorption-Control Unit

Figure 4C:
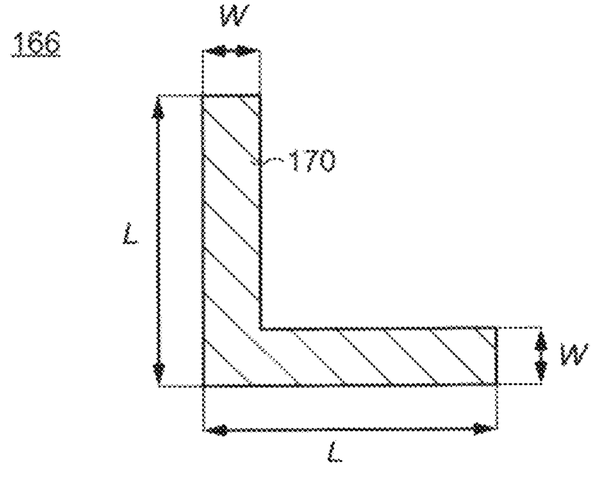
FIG. 4C is a schematic top view of a reflecting device according to an embodiment of the invention.

As shown in FIG. 4C, each absorption-control unit 166 may consist of a single L-shaped conductive film 170. Depending on the wavelength of the radio waves to be reflected, the lengths L of the mutually orthogonal arms (two linear portions existing through a bent portion) of the L-shaped conductive film 170 may be selected from a range equal to or greater than 0.5 mm and equal to or less than 2.0 mm, while the widths W of the arms may be selected from a range equal to or greater than 0.1 mm and equal to or less than 0.5 mm, for example. The two arms are preferred to be arranged orthogonally to each other. As demonstrated in the Example, formation of each absorption-control unit 166 with a single L-shaped conductive film 170 enables effective absorption of radio waves in a wider frequency range. In addition, since the L-shaped conductive film 170 can be recognized as a structure composed of two orthogonal conductive films, each absorption-control unit 166 can absorb both polarized waves. Therefore, the arrangement directions of the L-shaped conductive films 170 may be the same between the plurality of absorption-control units 166.

(2) Arrangement of Metasurface

Figure 6:
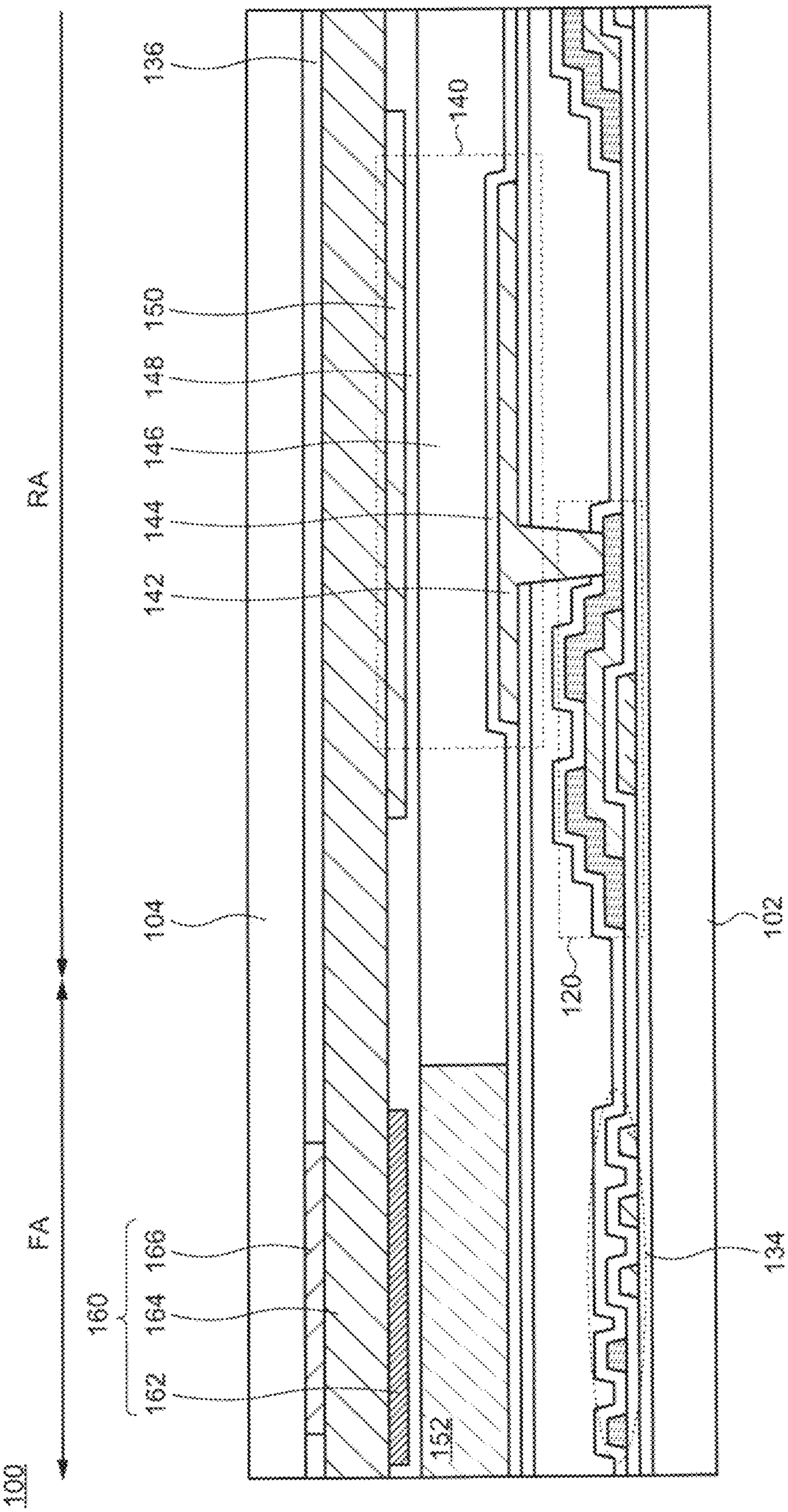
FIG. 6 is a schematic cross-sectional view of a reflecting device according to an embodiment of the invention.

In the reflecting device 100 having the configuration described above, the metasurface 160 is disposed over the counter substrate 104. However, the position of the metasurface 160 is not limited to that of the above configuration. For example, as shown in FIG. 6, the counter substrate 104 may be placed over the metasurface 160. In this case, the common electrode 150 and the first conductive film 162 may be formed over the insulating layer 164 directly or through the overcoat 132. Hence, the common electrode 150 and the first conductive film 162 may exist in the same layer. The counter substrate 104 may be fixed to the absorption-control unit 166 and the insulating layer 164 using the adhesive layer 136. Alternatively, the absorption-control unit 166, the insulating layer 164, the first conductive film 162, the common electrode 150, and the second orientation film 148 may be sequentially stacked over the counter substrate 104 and then bonded to the array substrate 102. Note that, although not illustrated, the counter substrate 104 may not be provided over the metasurface 160 to allow the insulating layer 164 and the absorption-control unit 166 of the metasurface 160 to be directly exposed to the atmosphere.

Figure 7:
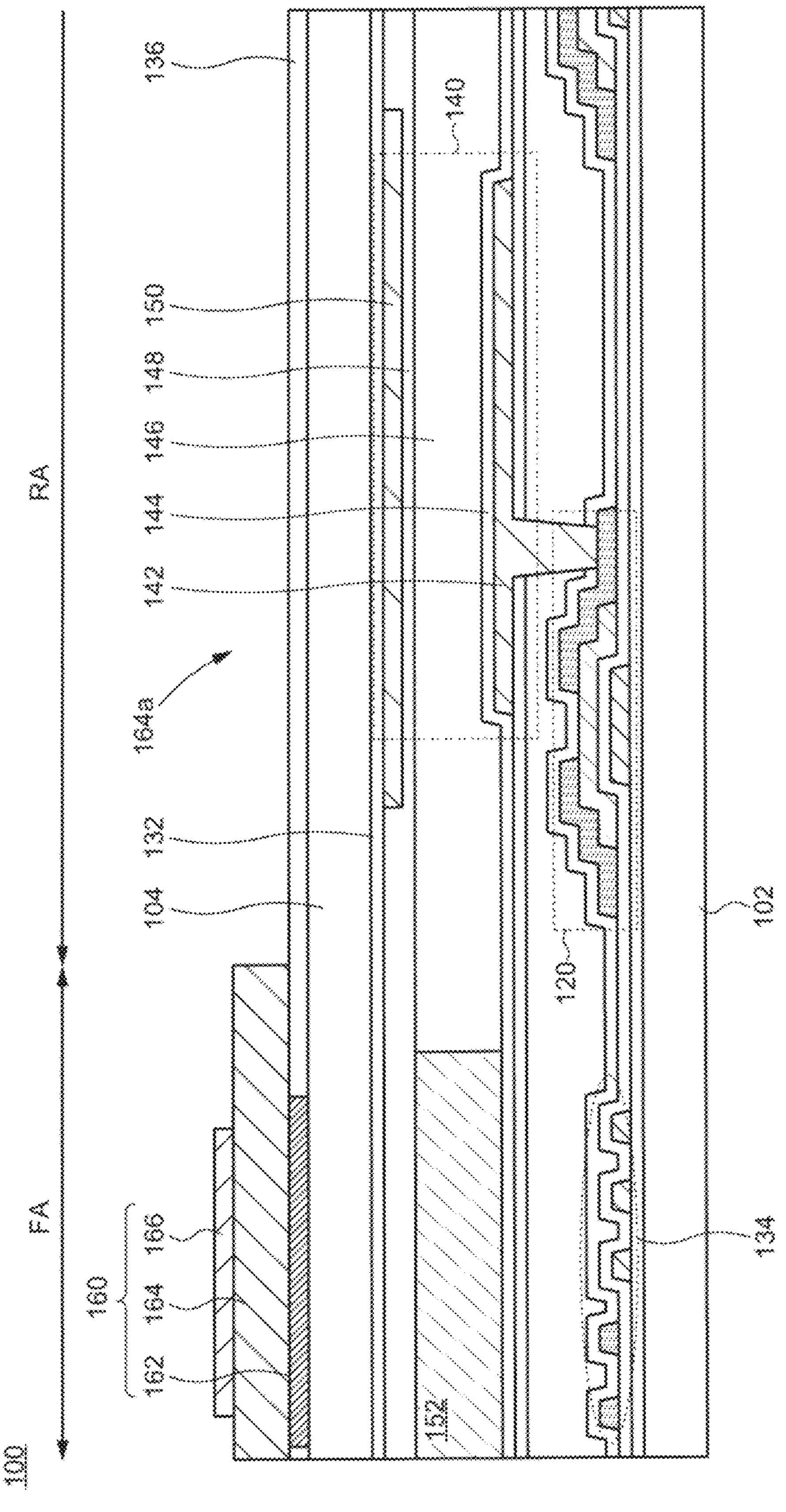
FIG. 7 is a schematic cross-sectional view of a reflecting device according to an embodiment of the invention.

Alternatively, the insulating layer 164 does not need to cover the entire counter substrate 104 as shown in FIG. 7 and may have an opening 164*a* exposing all or at least part of the radio-wave reflection area RA. The formation of the opening 164*a* prevents the radio waves incident on the radio-wave reflection area RA from being absorbed by the insulating layer 164. When the reflecting device 100 requires high light transparency, the reduction of light transmittance caused by the insulating layer 164 can be avoided.

Figure 8:
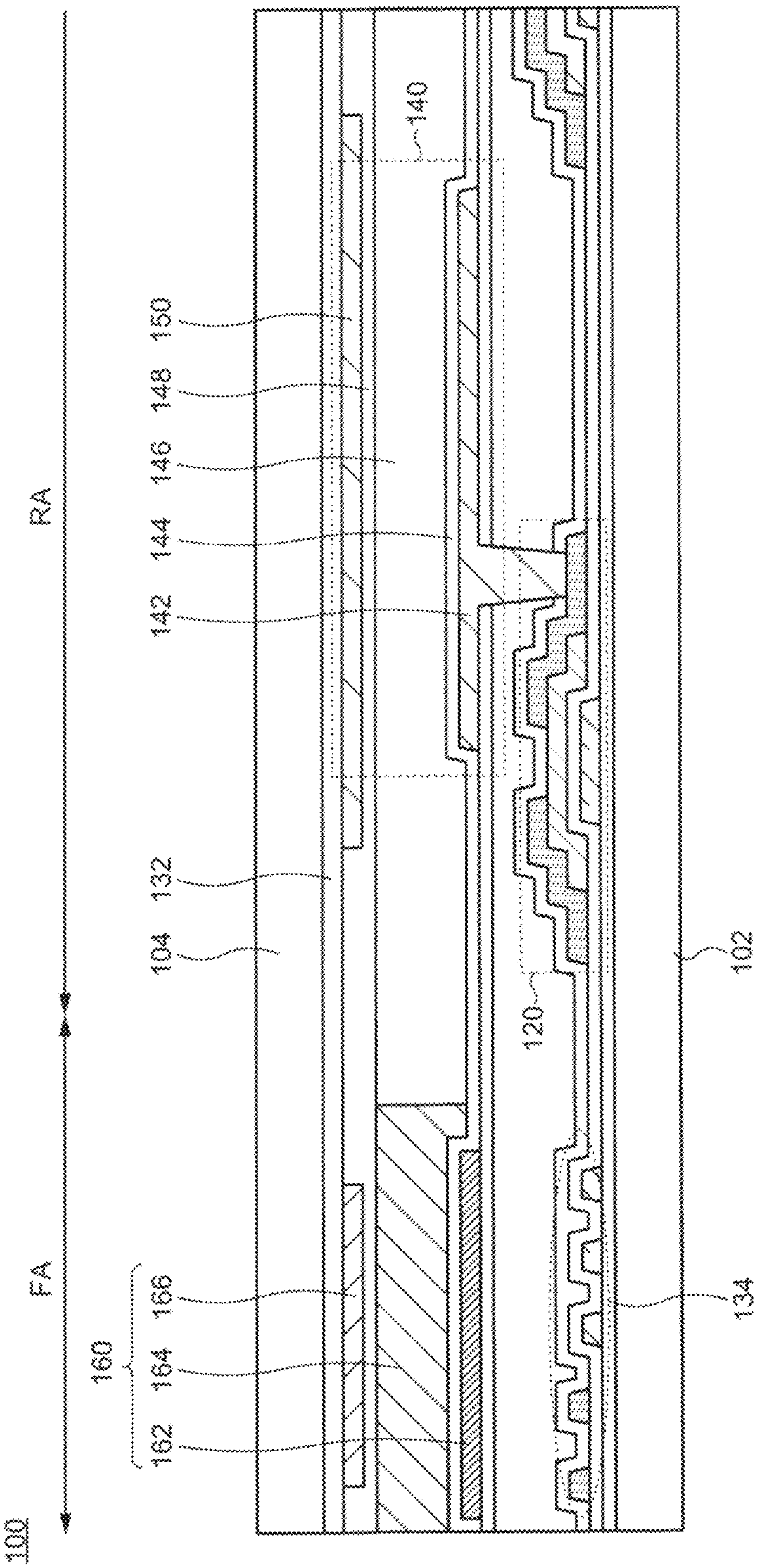
FIG. 8 is a schematic cross-sectional view of a reflecting device according to an embodiment of the invention.

Alternatively, the insulating layer 164 may be used instead of the sealing material 152 as shown in FIG. 8. In other words, the insulating layer 164 may function as a sealing material, and the array substrate 102 and the counter substrate 104 may be fixed to each other with the insulating layer 164. In this case, the first conductive film 162 may be provided over the leveling film 116 or the interlayer insulating film 118. It is also possible to simultaneously form the first conductive film 162 and the driving electrode 142 so that they exist in the same layer as each other. On the other hand, the absorption-control unit 166 may be provided over the counter substrate 104 directly or through the overcoat 132. In addition, it is also possible to simultaneously form the absorption-control unit 166 and the common electrode 150 so that they exist in the same layer as each other.

Figure 9:
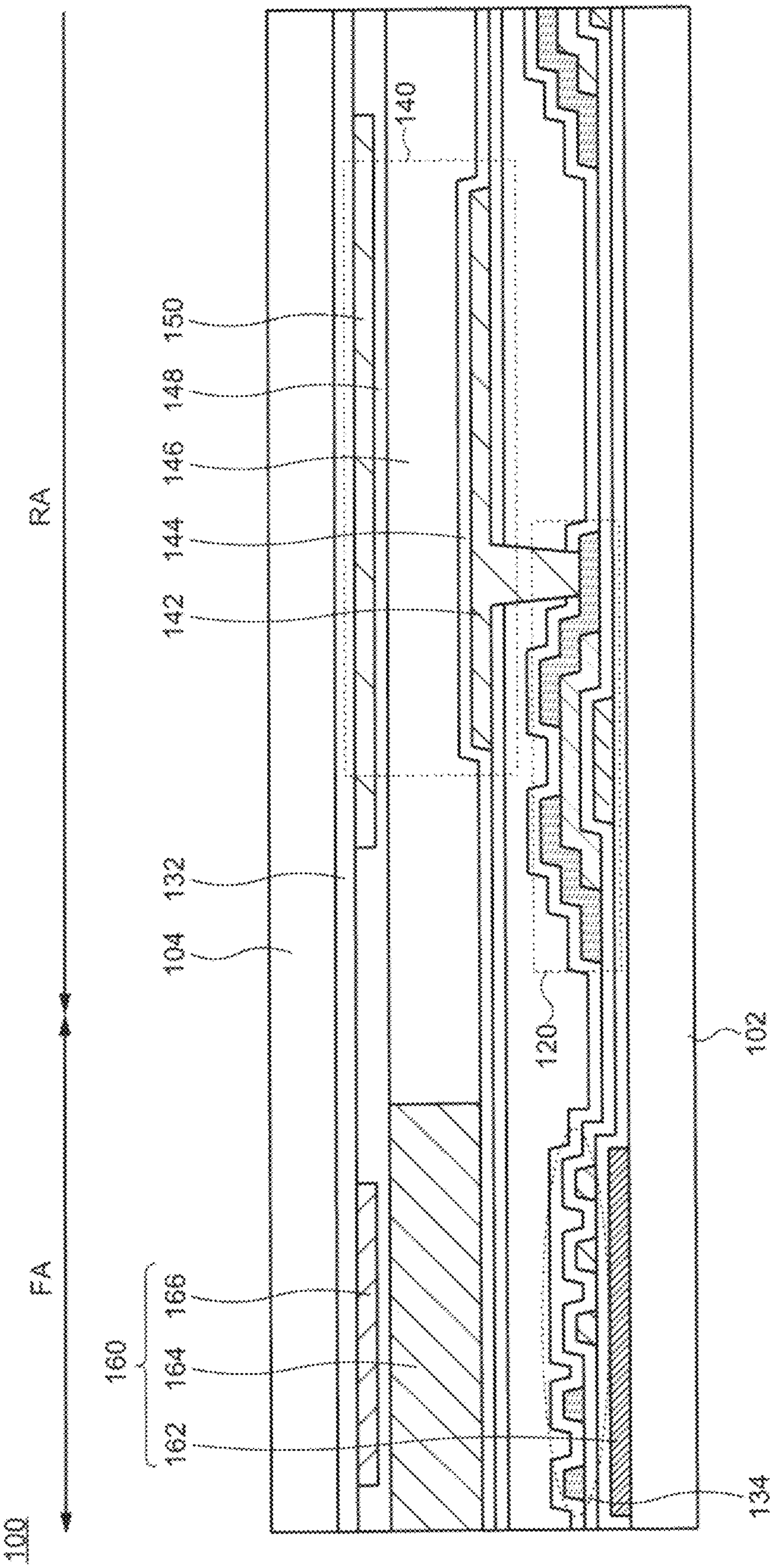
FIG. 9 is a schematic cross-sectional view of a reflecting device according to an embodiment of the invention.

Alternatively, the first conductive film 162 may be provided between the array substrate 102 and the wirings 134 as shown in FIG. 9. Although not illustrated, when the wirings 134 each exist in the same layer as the terminals 128 and 130, the first conductive film 162 and the gate electrode 122 may be simultaneously formed so as to exist in the same layer as each other.

(3) Incident Direction of Radio Waves

Figure 10:
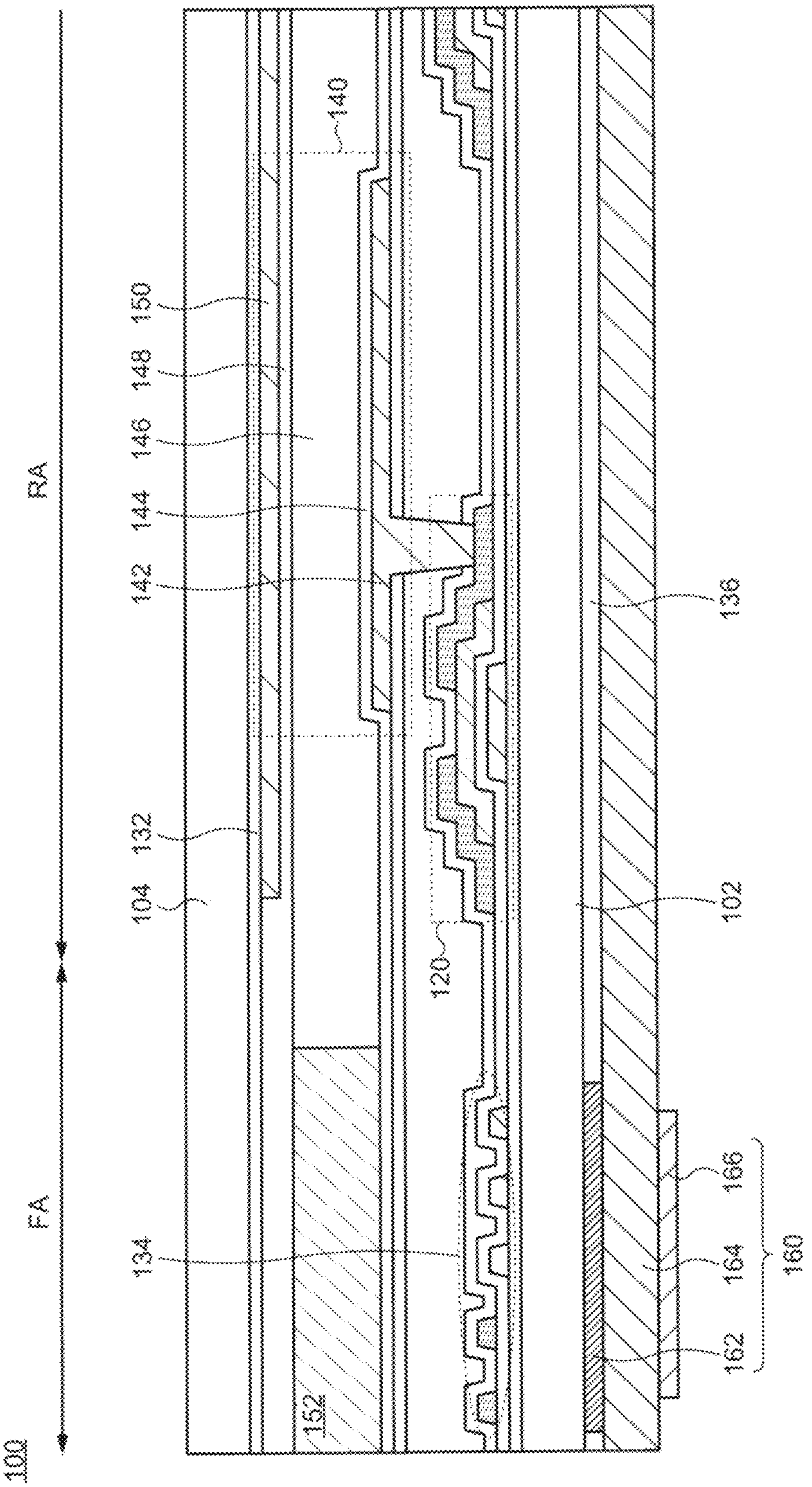
FIG. 10 is a schematic cross-sectional view of a reflecting device according to an embodiment of the invention.

In all of the reflecting devices 100 with the aforementioned configurations, radio waves are incident from the common electrode 150 side (i.e., the counter substrate 104 side). However, the reflecting device 100 may be configured so that radio waves incident from the driving electrode 142 side (i.e., the array substrate 102 side) are reflected in any direction. For example, the common electrode 150 is configured as a patch electrode so as to be shared by all or a plurality of reflecting elements 140 as shown in FIG. 10. On the other hand, the driving electrode 142 is configured to have a symmetrical shape such as a regular polygon or a circle. The size of the driving electrode 142 may be adjusted according to the wavelength of the radio waves to be reflected, and the length in the row direction and the column direction may be adjusted to be equal to or greater than 1 mm and equal to or less than 40 mm, for example. Furthermore, the metasurface 160 is provided on the underside of the array substrate 102. That is, the metasurface 160 is configured so that the first conductive film 162 is positioned over the absorption-control unit 166 through the insulating layer 164, and the array substrate 102 and the counter substrate 104 are placed on the first conductive film 162 side. The metasurface 160 may be fixed to the array substrate 102 using the adhesive layer 136.

Figure 11:
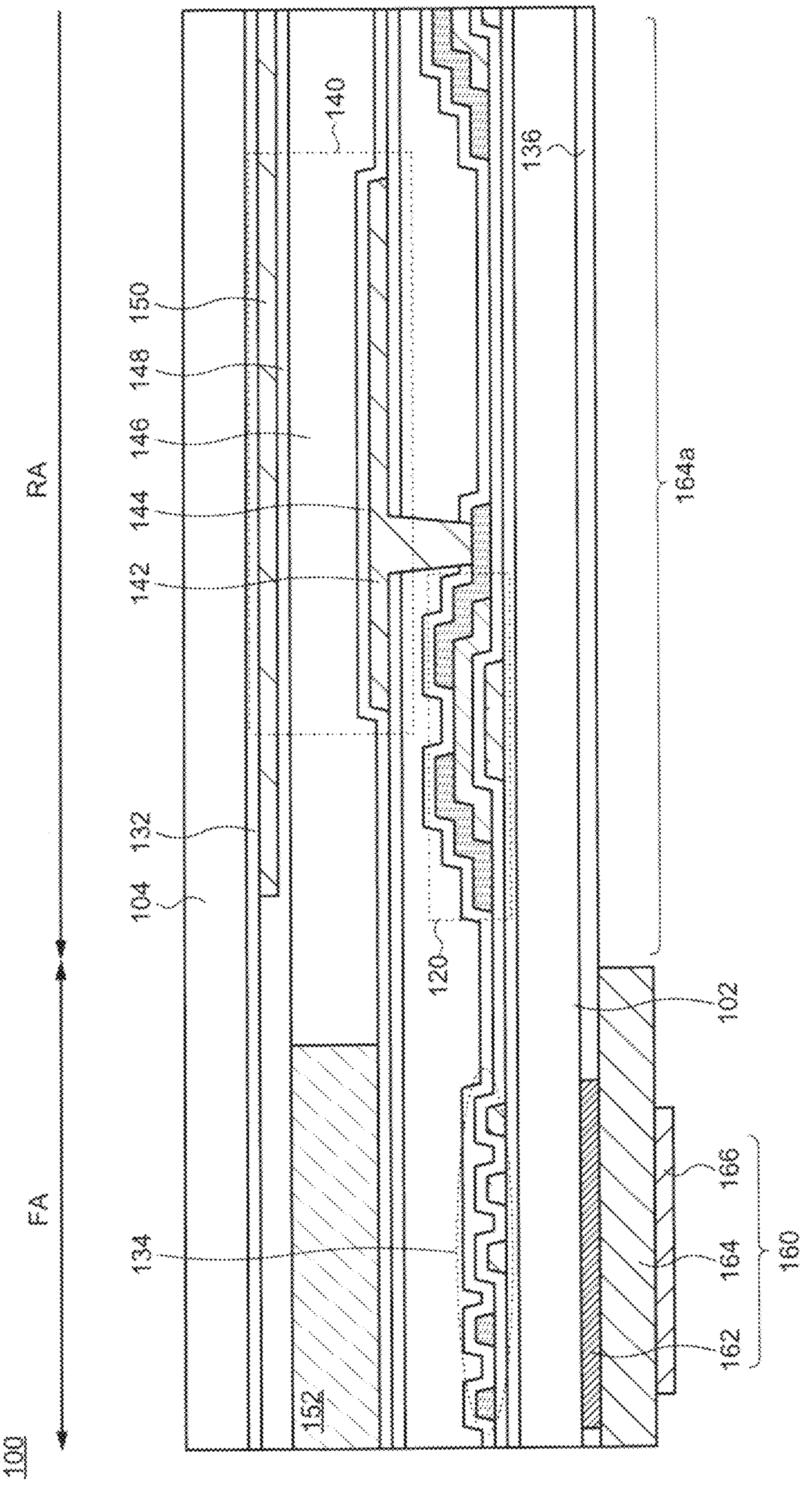
FIG. 11 is a schematic cross-sectional view of a reflecting device according to an embodiment of the invention.
Figure 12:
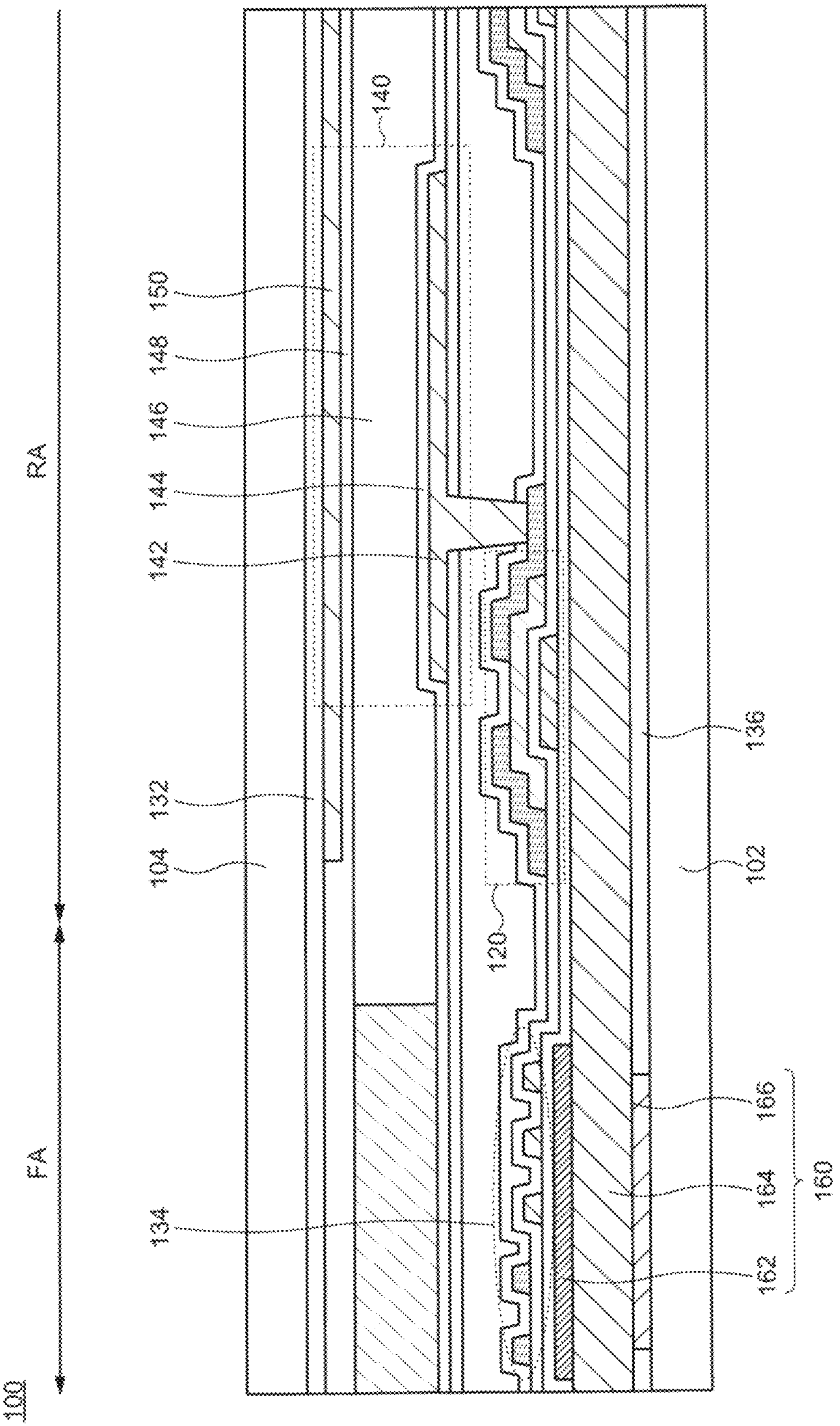
FIG. 12 is a schematic cross-sectional view of a reflecting device according to an embodiment of the invention.

Similar to the modified example shown in FIG. 7, it is also unnecessary for the insulating layer 164 to cover the entire array substrate 102, and the insulating layer 164 may have the opening 164*a* overlapping the entire or at least a portion of the radio-wave reflection area RA (FIG. 11). As shown in FIG. 12, the array substrate 102 may also be placed under the metasurface 160. That is, the metasurface 160 may be placed between the array substrate 102 and the wirings 134. Furthermore, although not illustrated, the array substrate 102 may not be placed under the metasurface 160 to allow the absorption-control unit 166 and the insulating layer 164 to be directly exposed to the atmosphere. In this case, the insulating layer 164 functions as the array substrate 102, or a portion of the array substrate 102 functions as the insulating layer 164.

Employment of the above configurations allows the reflecting device 100 to absorb the radio waves incident on the frame area from the array substrate 102 side, thereby leading to the production of the reflecting device 100 with excellent reflection characteristics.

EXAMPLES

1. Example 1

In this example, the results of a simulation analysis of the influence of the differences in the number and length of the rectangular conductive films 168 on the radio-wave absorption characteristics of the metasurface 160 are described.

Figure 13A:
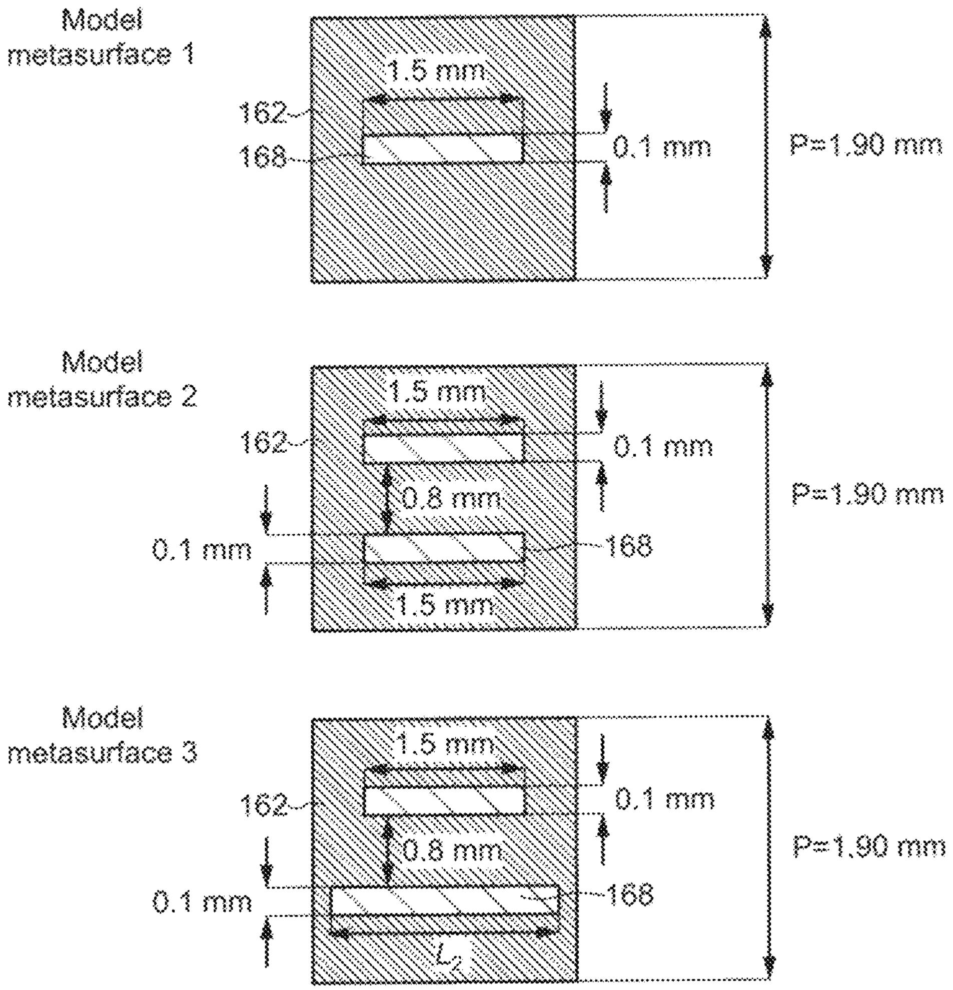
FIG. 13A includes schematic top views of the model metasurfaces of Example 1.

As shown in FIG. 13A, three kinds of model metasurfaces 1 to 3 were modeled. The model metasurfaces 1 to 3 each have the first conductive film 162, the insulating layer 164, and the absorption-control unit 166 and are different in the length or arrangement of the rectangular conductive films 168 structuring the absorption-control unit 166. The electrical conductivity of the first conductive film 162 and rectangular conductive film 168 was set to be $3.5\times10^7$ S/m, the dielectric constant of the insulating layer 164 was set to be 5.4 which is the relative dielectric constant of glass, and the thickness of the insulating layer 164 was set to be 0.5 mm. Other parameters of the model metasurfaces 1 to 3 are shown in FIG. 13A. For the model metasurface 3, the length of one rectangular conductive film 168 was fixed at 1.5 mm, and the other was varied for the simulation. The simulations were performed under the conditions where the absorption-control unit 166 is exposed to air.

Figure 14:
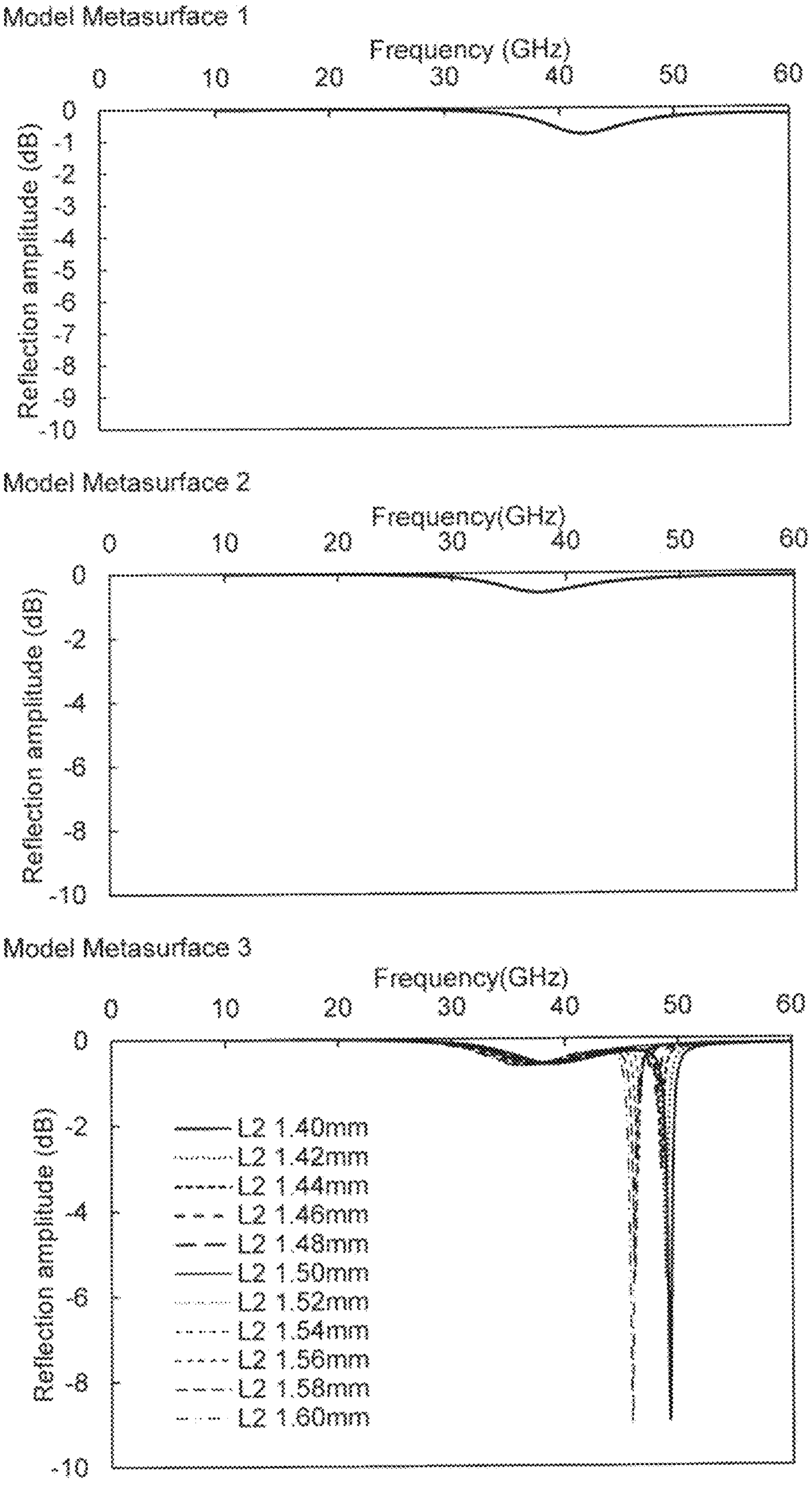
FIG. 14 includes plots showing the frequency dependence of the radio-wave absorption strength of the model metasurfaces of Example 1.

FIG. 14 shows the simulation results. The vertical axis of the graph shown in FIG. 14 represents the decay of the amplitude of the reflected radio waves in normal logarithm, and a decrease in value indicates stronger absorption of radio waves. As can be understood from FIG. 14, for the model metasurface 1 consisting of a single rectangular conducting film 168 and the model metasurface 2 consisting of two rectangular conducting films with the same length, the radio-wave absorption is small over the frequency range of 10 GHz to 60 GHz. In contrast, the model metasurface 3 consisting of two rectangular conductive films with different lengths shows strong absorption of radio waves in a specific frequency band. The radio-wave absorption strength and the frequency of the absorbed radio waves depend on the difference in the length between the two rectangular conductive films 168. These results clearly reveal that the formation of two rectangular conductive films with different lengths enables effective absorption of radio waves and that appropriate adjustment of the difference in length makes it possible to control the radio-wave absorption strength and the frequency of radio waves to be absorbed.

2. Example 2

In this example, the results of a simulation analysis of the influence of the difference in length of two rectangular conductive films 168 on the radio-wave absorption characteristics of the metasurface 160 are described.

Figure 13B:
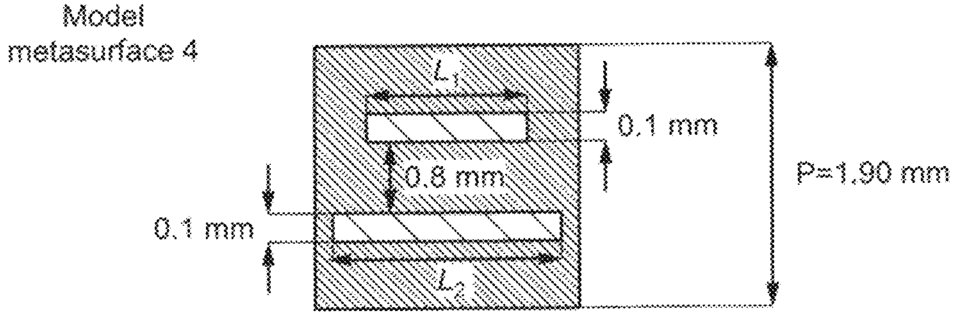
FIG. 13B is a schematic top view of the model metasurface of Example 2.

A model metasurface 4 with two rectangular conducting films 168 was modeled as shown in FIG. 13B. The length $L_1$ of one rectangular conducting film 168 was fixed at 1.40 mm, 1.45 mm, 1.50 mm, 1.55 mm, or 1.60 mm, and the length $L_2$ of the other rectangular conducting film 168 was varied for the simulation. The parameters of the model metasurface 4 are shown in FIG. 13B, and other parameters and the simulation setup conditions were the same as those in Example 1.

Figure 15A:
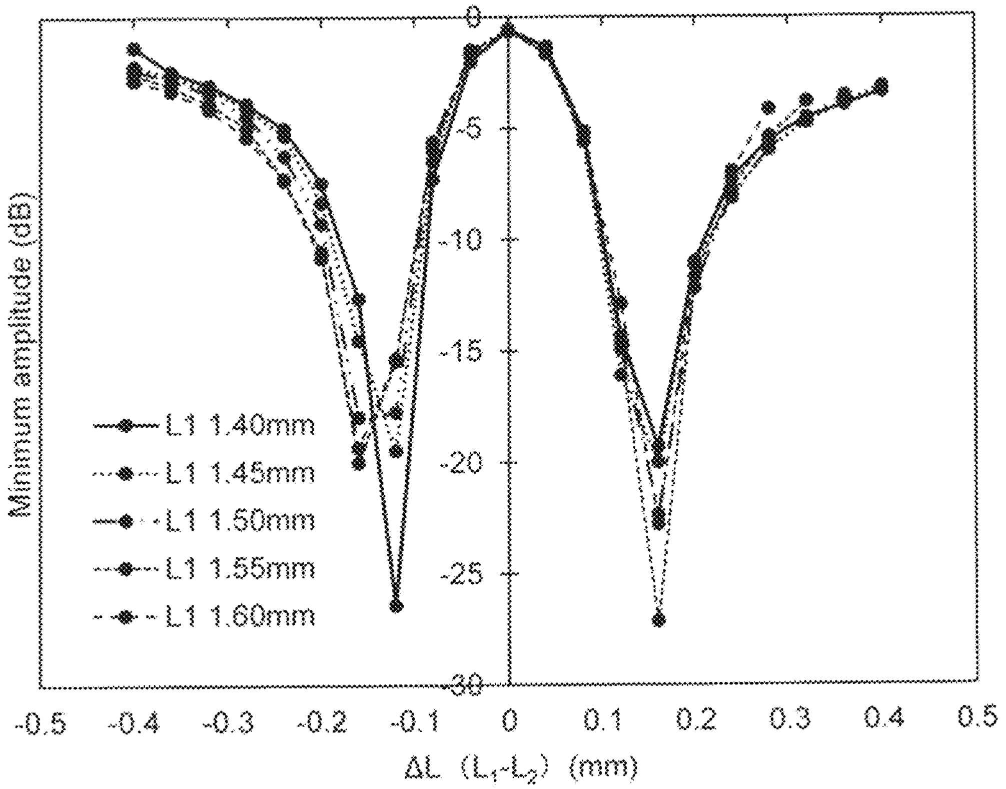
FIG. 15A includes plots showing the influence of the difference in the length of the rectangular conductive film on the radio-wave absorption strength of the model metasurfaces of Example 2.
Figure 15B:
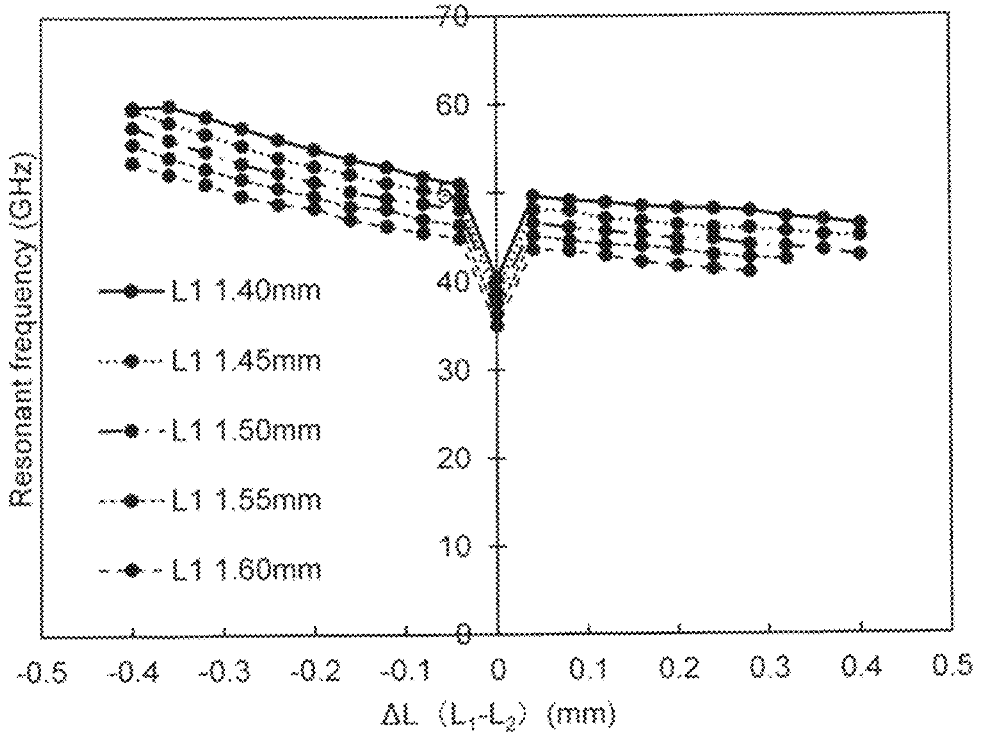
FIG. 15B includes plots showing the influence of the difference in the length of the rectangular conductive film on the frequency of radio waves absorbed by the model metasurfaces of Example 2.

Simulation results are shown in FIG. 15A. The vertical axis of the graph in FIG. 15A shows the minimum amplitude of the reflected radio waves in the ordinary logarithm. It can be understood from FIG. 15A that the absorption characteristics change with the difference in the length of the rectangular conductive film 168 and that radio waves can be strongly absorbed when the difference therebetween is equal to or more than 0.1 mm and equal to or less than 0.2 mm. FIG. 15B shows the plot of the frequency at which the radio-wave absorption strength is maximum with respect to the difference in the length of the rectangular conductive film 168. As can be understood from FIG. 15B, when there is no difference in the length between the rectangular conductive films 168 (when $\Delta L=0$ mm), the frequency of the absorbed radio waves is about 35 GHz, whereas it is possible to effectively absorb radio waves with frequencies from 40 GHz to 60 GHz by providing a difference of 0.05 mm or more therebetween. From the above results, it can be understood that the frequency of the radio waves to be absorbed and their absorption characteristics can be controlled by setting the length of the two rectangular conductive films 168 and the difference therebetween as appropriate.

3. Example 3

In this example, the results of a simulation analysis of the influence of the distance D between two rectangular conductive films 168 on the radio-wave absorption characteristics of the metasurface 160 are described.

Figure 16A:
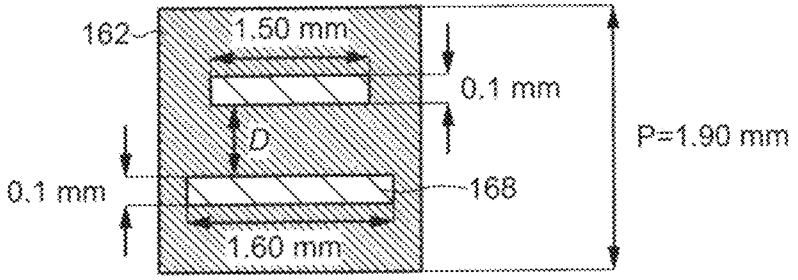
FIG. 16A is a schematic top view of the model metasurface of Example 3.

A model metasurface 5 shown in FIG. 16A was used to analyze the radio-wave absorption characteristics by simulation while varying the distance D. The parameters of the model metasurface 5 are shown in FIG. 16A. Other parameters and the simulation setup conditions were the same as those in Example 1.

Figure 17A:
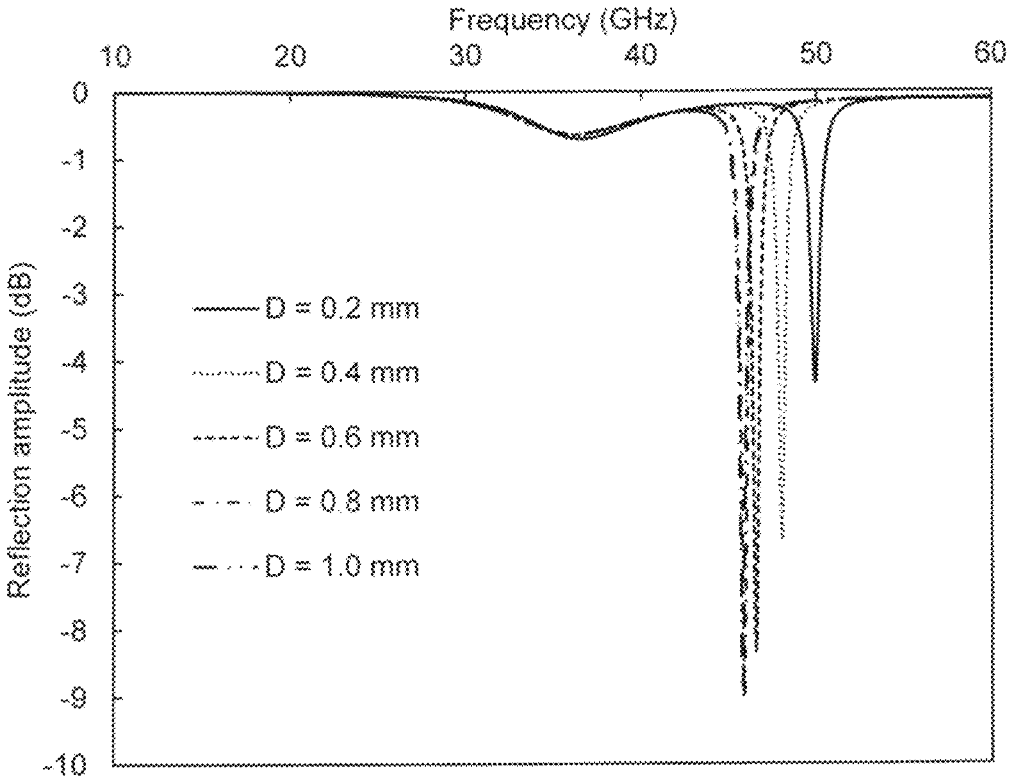
FIG. 17A includes plots showing the frequency dependence of the radio-wave absorption strength of the model metasurfaces of Example 3.

FIG. 17A shows the simulation results. The vertical axis of the graph in FIG. 17A represents the decay of the amplitude of the reflected radio waves in normal logarithm, and a decrease in value indicates stronger absorption of radio waves. As shown in FIG. 17A, the absorption characteristics significantly change as the distance D is varied, indicating that metasurface 160 strongly absorbs radio waves in a specific frequency band depending on the distance D. In other words, the frequency of the radio waves to be absorbed can be controlled by appropriately setting the distance D. Furthermore, it can also be understood that radio waves can be absorbed more strongly by setting the area occupied by each absorption-control unit 166, i.e., the distance D between the rectangular conductive films 168, to be 0.4 to 0.6 times the pitch P.

4. Example 4

In this example, the results of a simulation analysis of the influence of the width W of the rectangular conductive film 168 on the radio-wave absorption characteristics of the metasurface 160 are described.

Figure 16B:
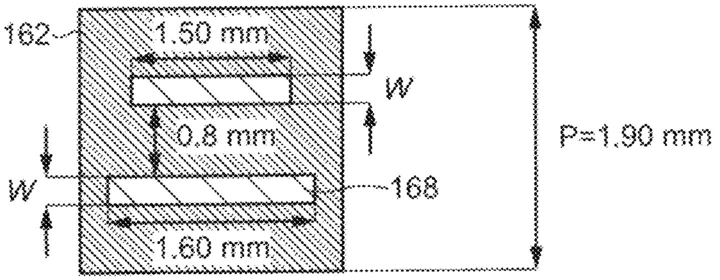
FIG. 16B is a schematic top view of the model metasurface of Example 4.

A model metasurface 6 shown in FIG. 16B was used to analyze the radio-wave absorption characteristics by simulation while varying the width W of two rectangular conductive films 168. The parameters of the model metasurface 6 are shown in FIG. 16B, and other parameters and the simulation setup conditions were the same as those in Example 1.

Figure 17B:
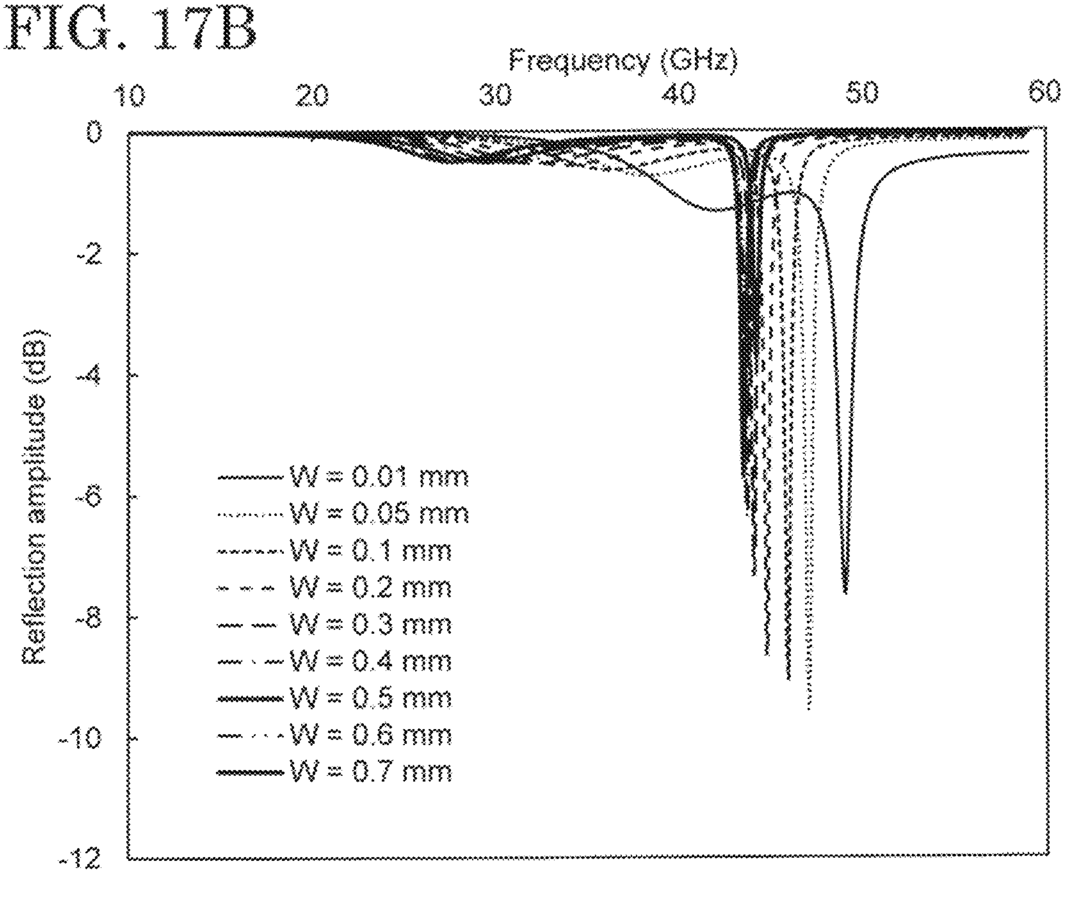
FIG. 17B includes plots showing the frequency dependence of the radio-wave absorption strength of the model metasurfaces of Example 4.

FIG. 17B shows the simulation results. The vertical axis of the graph in FIG. 17B shows the decay of the amplitude of the reflected radio waves in normal logarithm, and a decrease in value indicates stronger absorption of radio waves. As shown in FIG. 17B, the absorption characteristics significantly change as the width W is varied, indicating that metasurface 160 strongly absorbs radio waves in a specific frequency band depending on the width W. In other words, the frequency of the radio waves to be absorbed can be controlled by setting the width W appropriately. It can also be understood that high absorption characteristics can be obtained when the width W is equal to or more than 1% and equal to or less than 10% of the pitch P of the absorption-control unit 166.

5. Example 5

In this example, the results of a simulation analysis of radio-wave absorption characteristics are described where the plurality of absorption-control units 166 each having two rectangular conductive films 168 is arranged so that the longitudinal directions of the rectangular conductive films 168 alternate.

Figure 18A:
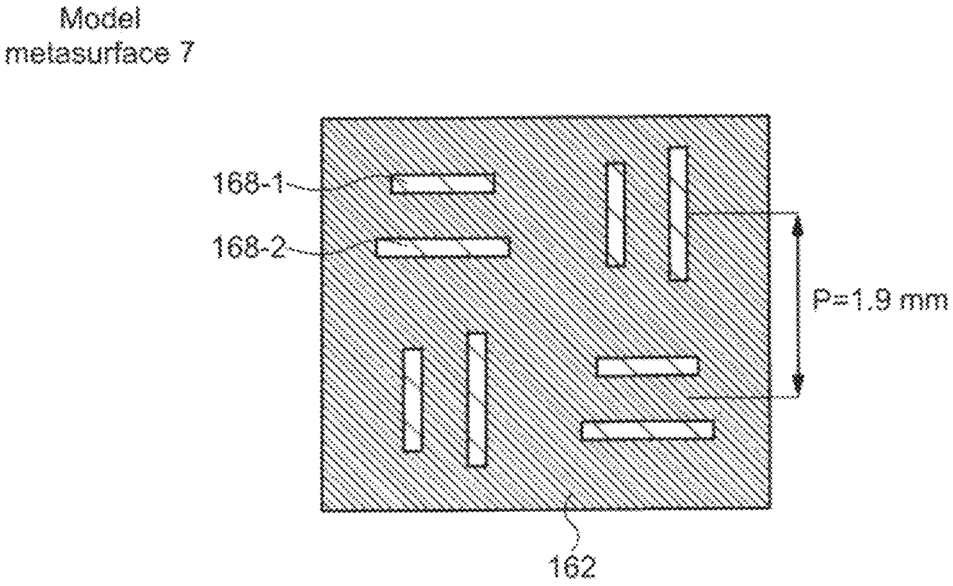
FIG. 18A is a schematic top view of the model metasurface of Example 5.
Figure 18B:
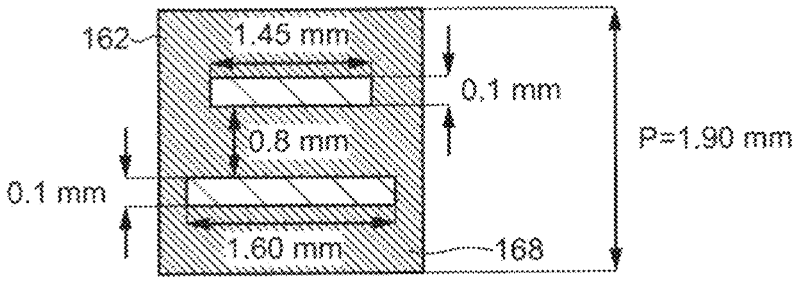
FIG. 18B is a schematic top view of the model metasurface in Example 5.

A model metasurface 7 shown in FIG. 18A was used to analyze the absorption characteristics of horizontally polarized waves and vertically polarized waves by simulation. In the model metasurface 7, four absorption-control units 166 each having two rectangular conducting films 168 are arranged. The longitudinal directions of the rectangular conducting films 168 of two of these absorption-control units 166 are orthogonal to those of the other absorption-control units 166. Other parameters of the model metasurface 7 were as shown in FIG. 18A, and the parameters of each absorption-control unit 166 were as shown in FIG. 18B. Other parameters and the simulation setup conditions were the same as those in Example 1.

Figure 19:
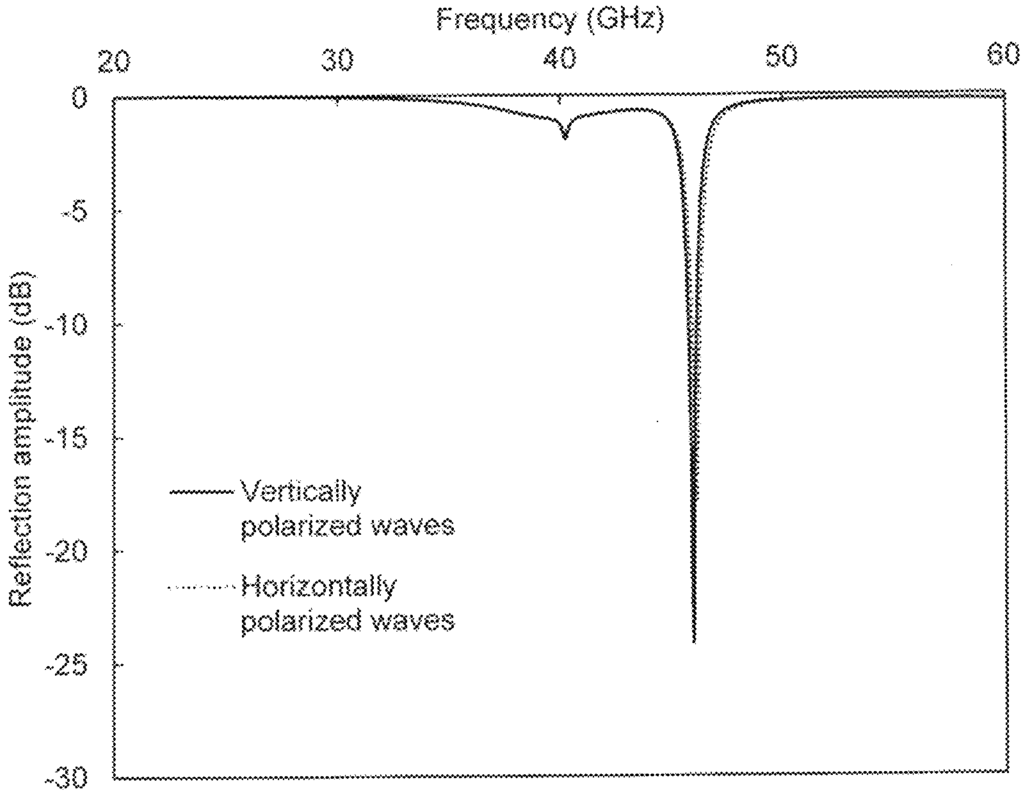
FIG. 19 includes plots showing the frequency dependence of the radio-wave absorption strength of the model metasurface of Example 5.

FIG. 19 shows the simulation results. The vertical axis of the graph in FIG. 19 shows the decay of the amplitude of the reflected radio waves in normal logarithm, and a decrease in value indicates stronger absorption of radio waves. As shown in FIG. 19, it can be understood that the model metasurface 7 effectively absorbs both components of the horizontally polarized waves and the vertically polarized waves. This result indicates that, when the absorption-control unit 166 has a plurality of rectangular conductive films 168, radio waves can be effectively absorbed using the metasurface 160 including a plurality of absorption-control units 166 with different longitudinal directions of the rectangular conductive films 168.

6. Example 6

In this example, the results of a simulation analysis of the radio-wave absorption characteristics of the metasurface with the absorption-control unit 166 consisting of three rectangular conductive films 168 are described.

Figure 20:
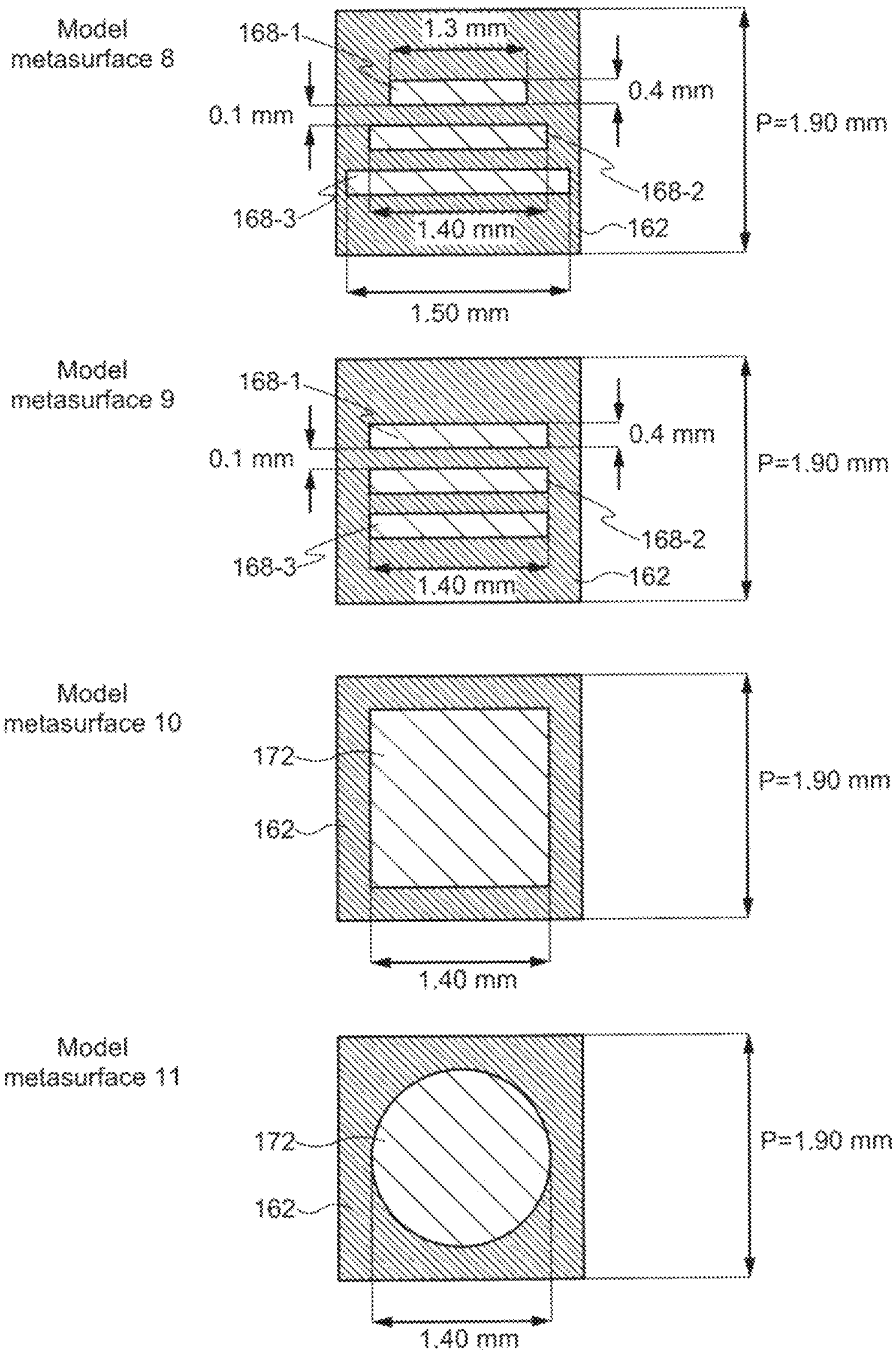
FIG. 20 includes schematic top views of the model metasurfaces of Example 6.

As shown in FIG. 20, model metasurfaces 8 and 9 with three rectangular conductive films 168 were modeled. The lengths of the rectangular conductive films 168 in the model metasurface 8 differ from each other, while the lengths of the rectangular conductive films 168 in the model metasurface 9 are identical to each other. As a comparison, model metasurfaces 10 and 11 respectively having square and circular conductive films 172 were also modeled and analyzed by simulation in the same way. The parameters of these model metasurfaces 8 to 11 are shown in FIG. 20, and other parameters and the simulation setup conditions were the same as those in Example 1.

Figure 21:
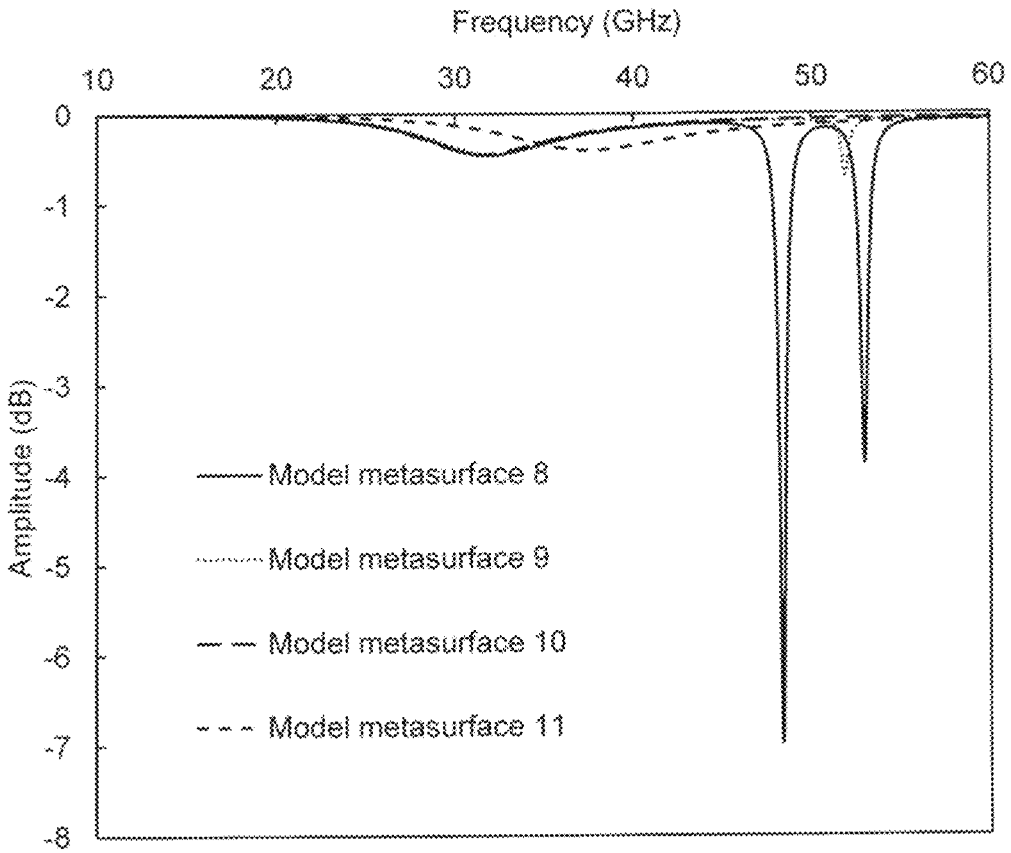
FIG. 21 includes plots showing the frequency dependence of the radio-wave absorption strength of the model metasurfaces of Example 6.

The results are shown in FIG. 21. The vertical axis of the graph in FIG. 21 shows the decay of the amplitude of the reflected radio waves in normal logarithm, and a decrease in value indicates stronger absorption of radio waves. As can be readily understood from FIG. 21, the model metasurfaces 10 and 11 do not exhibit significant absorption in the frequency band spanning 10 GHz to 60 GHz. Similarly, although the model metasurface 8 having the rectangular conductive films 168 with the same length also shows radio-wave absorption around 53 GHz, the absorption intensity is extremely small. In contrast, the model metasurface 9 having the rectangular conductive films with different lengths exhibits strong absorption around 48 GHz and 54 GHz. These results suggest that the number of rectangular conductive films 168 constituting each absorption-control unit 166 is not limited to two and that three or more rectangular conductive films 168 may be used to construct the metasurface 160 effectively absorbing radio waves.

7. Example 7

In this example, the results of a simulation analysis of the radio-wave absorption characteristics of the metasurface 160 in the reflecting device 100 having the structure shown in FIG. 6 are described.

In this example, the model metasurface 4 shown in FIG. 13B was used. The length $L_1$ of one rectangular conductive film 168 was fixed at 0.90 mm, 0.95 mm, 1.00 mm, 1.05 mm, or 1.10 mm, and the length $L_2$ of the other rectangular conductive film 168 was varied for the simulation. Other parameters of the model metasurface 4 are shown in FIG. 13B, and the other parameters were the same as those in Example 1. However, the counter substrate 104 is located over the metasurface 160 in the reflecting device 100 with the structure shown in FIG. 6. Thus, the simulation was carried out similar to the Example 1 under the conditions that the absorption-control unit 166 of the model metasurface 4 is not exposed to air, and a layer with a thickness of 0.5 mm and a relative permittivity of 5.4 exists over the absorption-control unit 166.

Figure 22A:
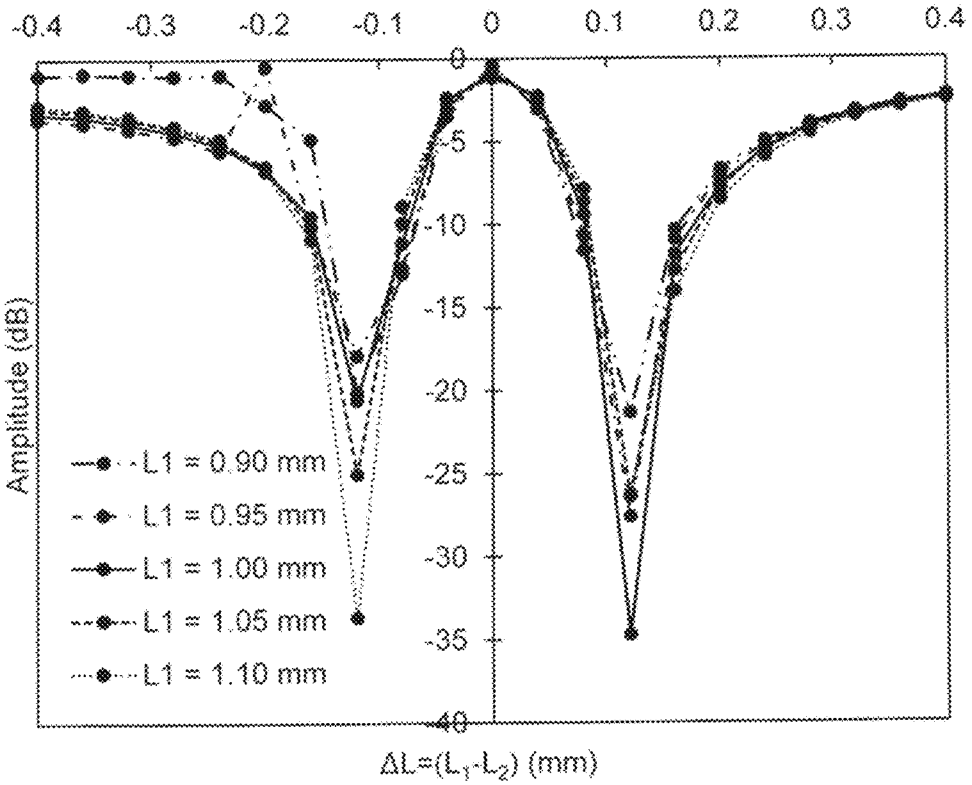
FIG. 22A includes plots showing the frequency dependence of the radio-wave absorption strength of the model metasurfaces of Example 7.
Figure 22B:
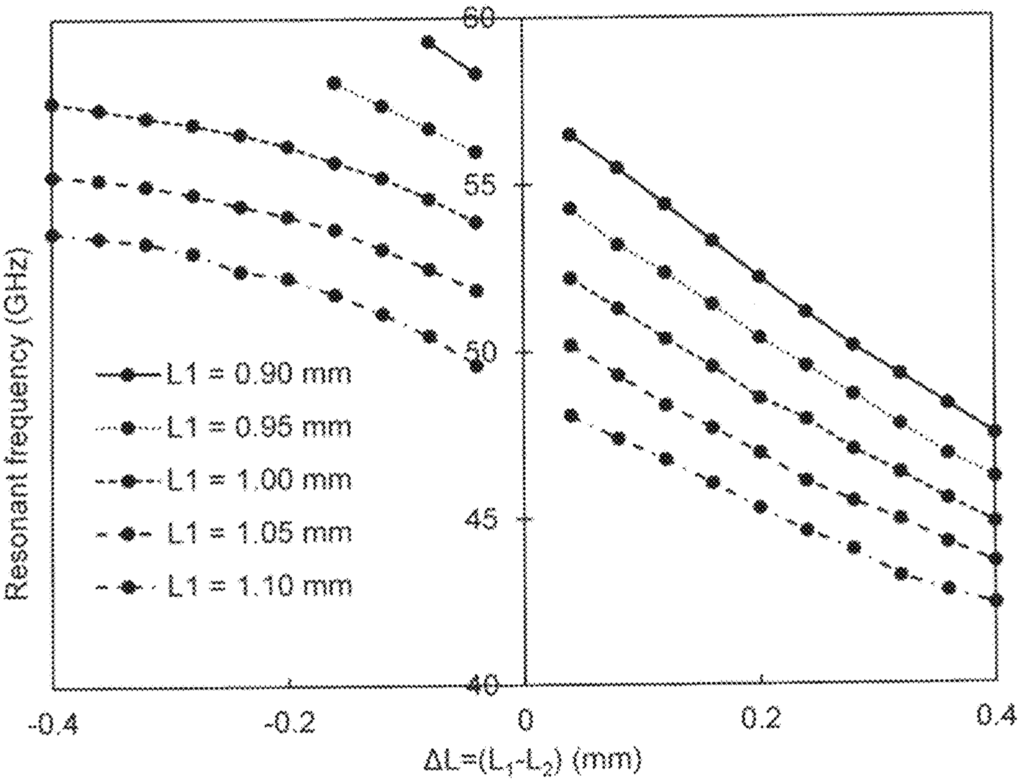
FIG. 22B includes plots showing the influence of the difference in the length of the rectangular conductive film on the frequency of radio waves absorbed by the model metasurfaces of Example 7.

Simulation results are shown in FIG. 22A. The vertical axis of the graph in FIG. 22A shows the minimum amplitude of the reflected radio waves in normal logarithm. From FIG. 22A, it can be seen that the absorption characteristics change with the difference in the length of the rectangular conductive film 168 and that radio waves can be strongly absorbed when the difference therebetween is equal to or more than 0.1 mm and equal to or less than 0.2 mm. FIG. 22B shows the plot of the frequency at which the radio-wave absorption strength is maximum with respect to the difference in the length of the rectangular conductive film 168. As can be understood from FIG. 22B, the maximum absorbed frequency varies with the difference in length of the rectangular conductive film 168. From the above results, it was confirmed that the frequency of the radio waves to be absorbed and their absorption characteristics can also be controlled by appropriately setting the lengths of the two rectangular conductive films 168 and the difference therebetween in the reflecting device 100 having the structure shown in FIG. 6.

8. Example 8

In this example, the results of a simulation analysis of the radio-wave absorption characteristics of the metasurface having the absorption-control unit 166 with the L-shaped conductive film 170 are described.

Figure 23:
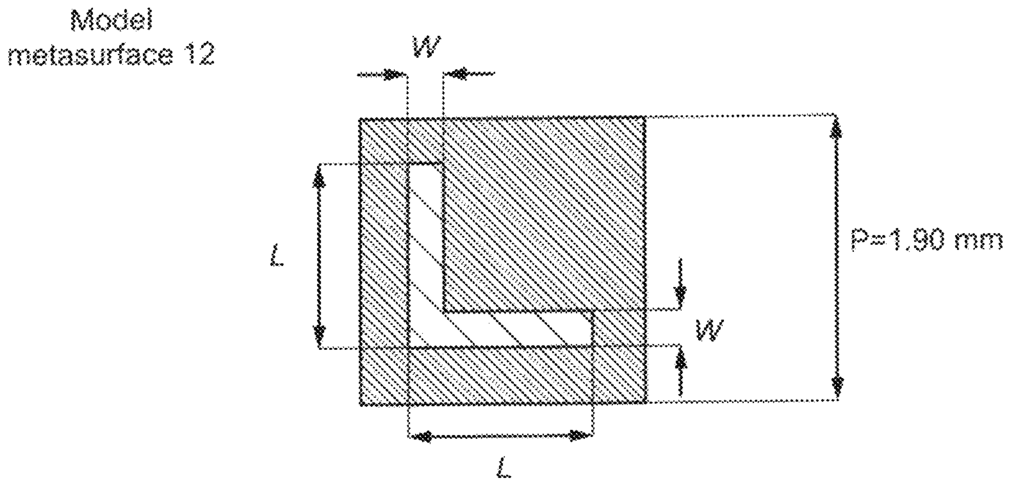
FIG. 23 is a schematic top view of the model metasurface of Example 8.

A schematic top view of a modeled model metasurface 12 is shown in FIG. 23. In this example, the simulation was performed similar to the Example 1 under the same conditions as in Example 7, where the absorption-control unit 166 is not exposed to air, and a layer with a thickness of 0.5 mm and a relative permittivity of 5.4 is present over the absorption-control unit 166. The parameters of the model metasurface 12 are shown in FIG. 23, and other parameters were the same as those in Example 1.

Figure 24:
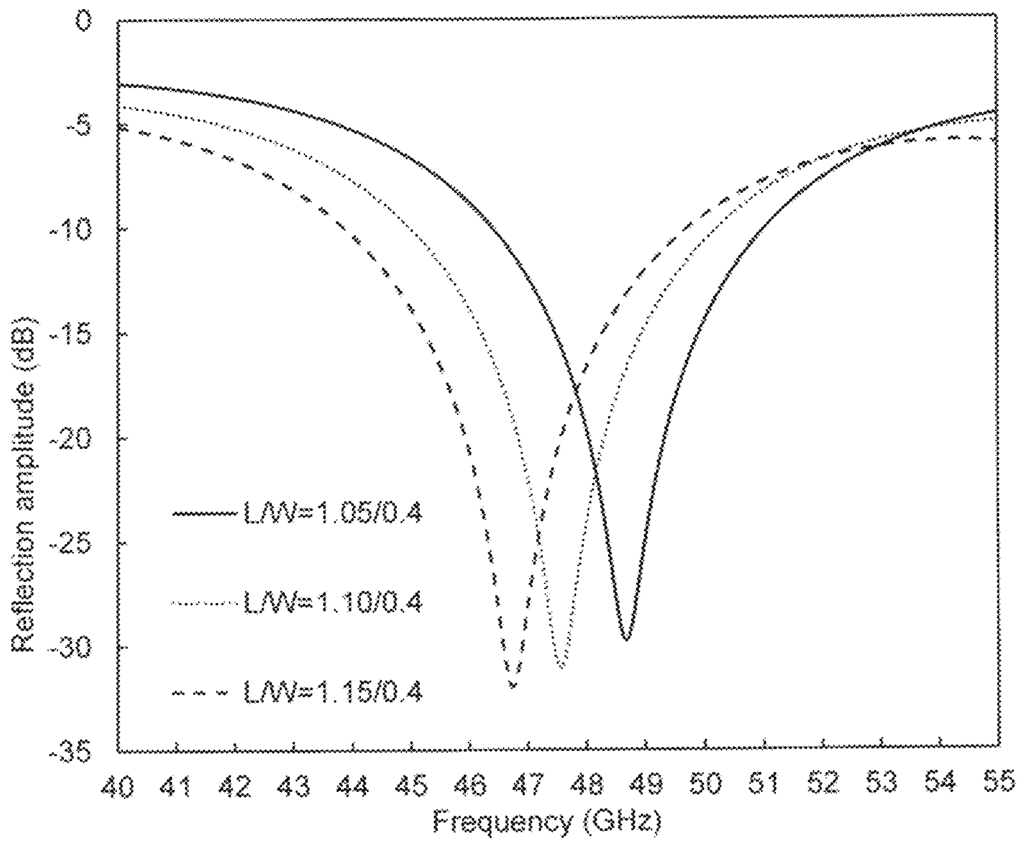
FIG. 24 includes plots showing the frequency dependence of the radio-wave absorption strength of the model metasurface of Example 8.

FIG. 24 shows the simulation results. The vertical axis of the graph in FIG. 24 represents the decay of the amplitude of the reflected radio waves in normal logarithm, and a decrease in value indicates stronger absorption of radio waves. As can be understood from FIG. 24, the model metasurface 12 with the L-shaped conductive film 170 also strongly absorbs radio waves in a specific frequency band. Compared with the model metasurface 3 or the like having the rectangular conductive film 168, the frequency range of absorbed radio waves is wider, and the model metasurface 12 can effectively absorb radio waves in a wide frequency range from about 50 GHz to about 45 GHz. It was also found that the frequency band of radio waves to be absorbed can be controlled by appropriately adjusting the length L and the width W of the arms of the L-shaped conductive film 170.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process on the basis of the reflecting element or the reflecting device of each embodiment is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. A reflecting device comprising:
an array substrate having a radio-wave reflection area and a frame area surrounding the radio-wave reflection area;
a plurality of reflecting elements over the radio-wave reflection area;
a wiring electrically connected to at least one of the plurality of reflecting elements and at least partly overlapping the frame area; and
a metasurface overlapping the wiring over the frame area, wherein the metasurface comprises:
a first conductive film;
a plurality of absorption-control units each overlapping the first conductive film and having at least one conductive film; and
an insulating layer between the first conductive film and the plurality of absorption-control units.

2. The reflecting device according to claim 1,
wherein the at least one conductive film is electrically floating.

3. The reflecting device according to claim 1,
wherein the at least one conductive film comprises first to nth (n is an integer equal to or greater than 2) rectangular conductive films parallel to one another and different in length from one another.

4. The reflecting device according to claim 3,
wherein longitudinal directions of the first to nth rectangular conductive films intersect one another between adjacent absorption-control units.

5. The reflecting device according to claim 3,
wherein n is 2 or 3.

6. The reflecting device according to claim 3,
wherein the first to nth rectangular conductive films overlap one another in a direction perpendicular to longitudinal directions thereof.

7. The reflecting device according to claim 1,
wherein the at least one conductive film consists of a single L-shaped conductive film.

8. The reflecting device according to claim 7,
wherein two linear portions of the L-shaped conductive film connected to each other via a bent portion intersect each other.

9. The reflecting device according to claim 1, further comprising a counter substrate over the array substrate,
wherein the metasurface is located over the counter substrate, and
the plurality of absorption-control units is located over the first conductive film with the insulating layer sandwiched therebetween.

10. The reflecting device according to claim 1, further comprising a counter substrate with the metasurface sandwiched therebetween,
the plurality of absorption-control units is located over the first conductive film with the insulating layer sandwiched therebetween.

11. The reflecting device according to claim 10,
wherein the insulating layer has an opening, and
at least a portion of the plurality of reflecting elements is exposed from the opening.

12. The reflecting device according to claim 1, further comprising a counter substrate over the array substrate,
wherein the plurality of absorption-control units is located over the first conductive film with the insulating layer sandwiched therebetween, and
the insulating layer fixes the array substrate and the counter substrate.

13. The reflecting device according to claim 1,
wherein the plurality of absorption-control units is located over the first conductive film with the insulating layer sandwiched therebetween, and
the first conductive film is located between the array substrate and the wiring.

14. The reflecting device according to claim 1,
wherein the metasurface is located under the array substrate, and
the plurality of absorption-control units is located under the first conductive film with the insulating layer sandwiched therebetween.

15. The reflecting device according to claim 14,
wherein the insulating layer has an opening overlapping the radio-wave reflection area.

16. The reflecting device according to claim 1,
wherein the metasurface is located between the array substrate and the wiring, and
the plurality of absorption-control units is located under the first conductive film with the insulating layer sandwiched therebetween.

* * * * *